United States Patent
Shibayama et al.

(10) Patent No.: US 7,253,965 B2
(45) Date of Patent: Aug. 7, 2007

(54) ZOOM LENS SYSTEM WITH VIBRATION REDUCTION

(75) Inventors: Atsushi Shibayama, Tokyo (JP); Takeshi Suzuki, Yokohama (JP); Tomoki Ito, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 11/237,743

(22) Filed: Sep. 29, 2005

(65) Prior Publication Data

US 2006/0072213 A1    Apr. 6, 2006

(30) Foreign Application Priority Data

Oct. 1, 2004  (JP) ............................. 2004-290346
Mar. 31, 2005 (JP) ............................. 2005-102731

(51) Int. Cl.
*G02B 15/14* (2006.01)

(52) U.S. Cl. .................. 359/687; 359/683; 359/684; 359/685; 359/715; 359/740; 359/774; 359/557

(58) Field of Classification Search ................ 359/557, 359/676, 683–687, 715, 740, 774
See application file for complete search history.

(56) References Cited

U.S. PATENT DOCUMENTS 6,462,885 B2 * 10/2002 Nishio ........................ 359/687

2001/0022696 A1    9/2001 Nishio

FOREIGN PATENT DOCUMENTS

| JP | 10 232420 A   | 9/1998  |
|----|---------------|---------|
| JP | 2001-166208 A | 6/2001  |
| JP | 2002-6217 A   | 1/2002  |
| JP | 2003-050350 A | 2/2003  |
| JP | 2003-140048 A | 5/2003  |
| JP | 2003-295060 A | 10/2003 |

* cited by examiner

*Primary Examiner*—Evelyn A. Lester
(74) *Attorney, Agent, or Firm*—Miles & Stockbridge P.C.

(57) ABSTRACT

To provide a zoom lens system with a vibration reduction having a long back focal length suitable for a digital SLR camera, a high zoom ratio, and a wide angle of view of 70° or more. The system includes, in order from the object, a first positive lens group, a second negative lens group, a third positive lens group, and a fourth positive lens group. Upon zooming from wide-angle end state to telephoto end state, a distance between the first and second lens groups increases, a distance between the second and third lens groups decreases, and a distance between the third and fourth lens groups varies. The third lens group is composed of a positive front lens group and a negative rear lens group. Image plane correction upon camera shake can be performed by shifting only the rear lens group substantially perpendicularly to the optical axis. Given conditions are satisfied.

36 Claims, 24 Drawing Sheets

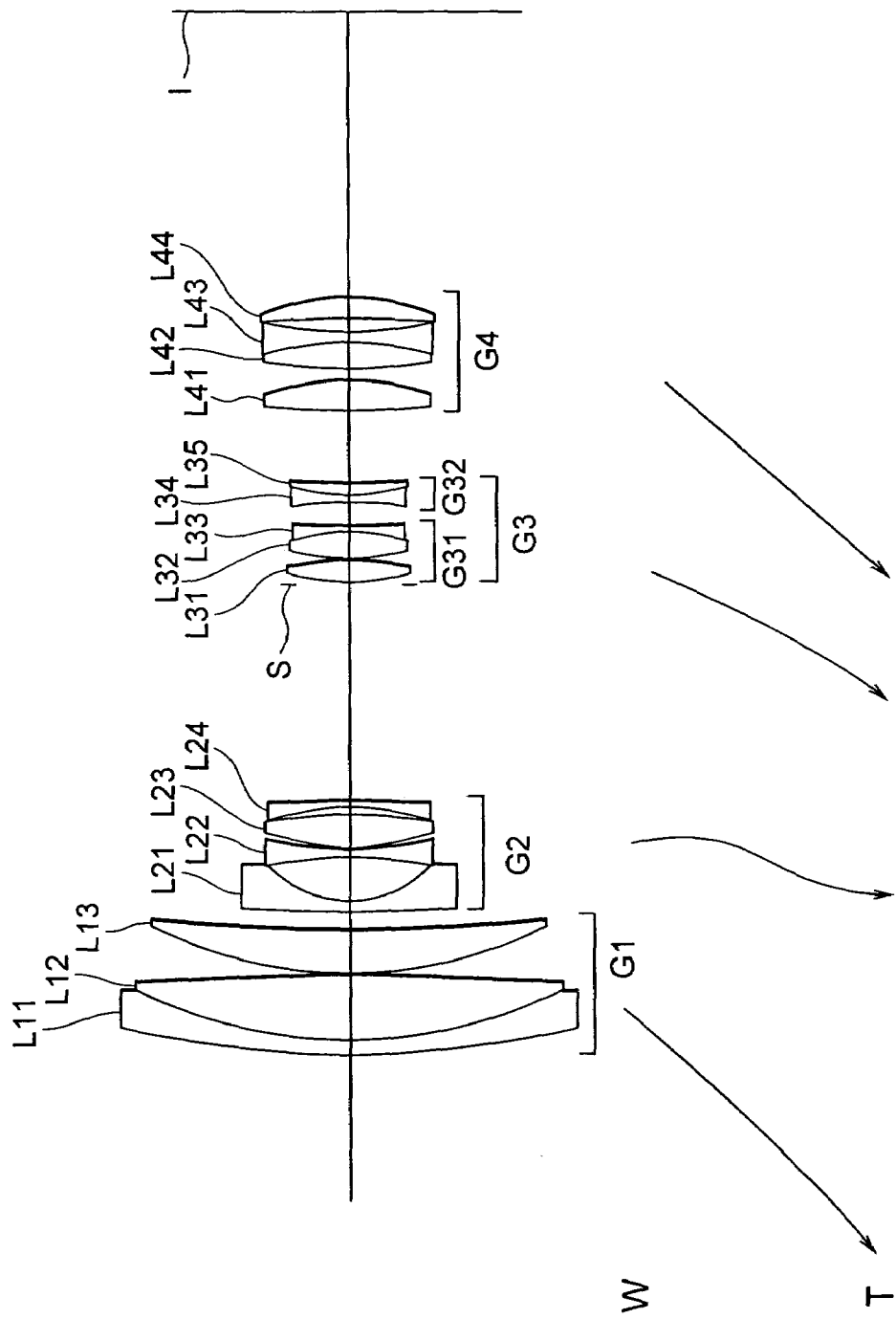

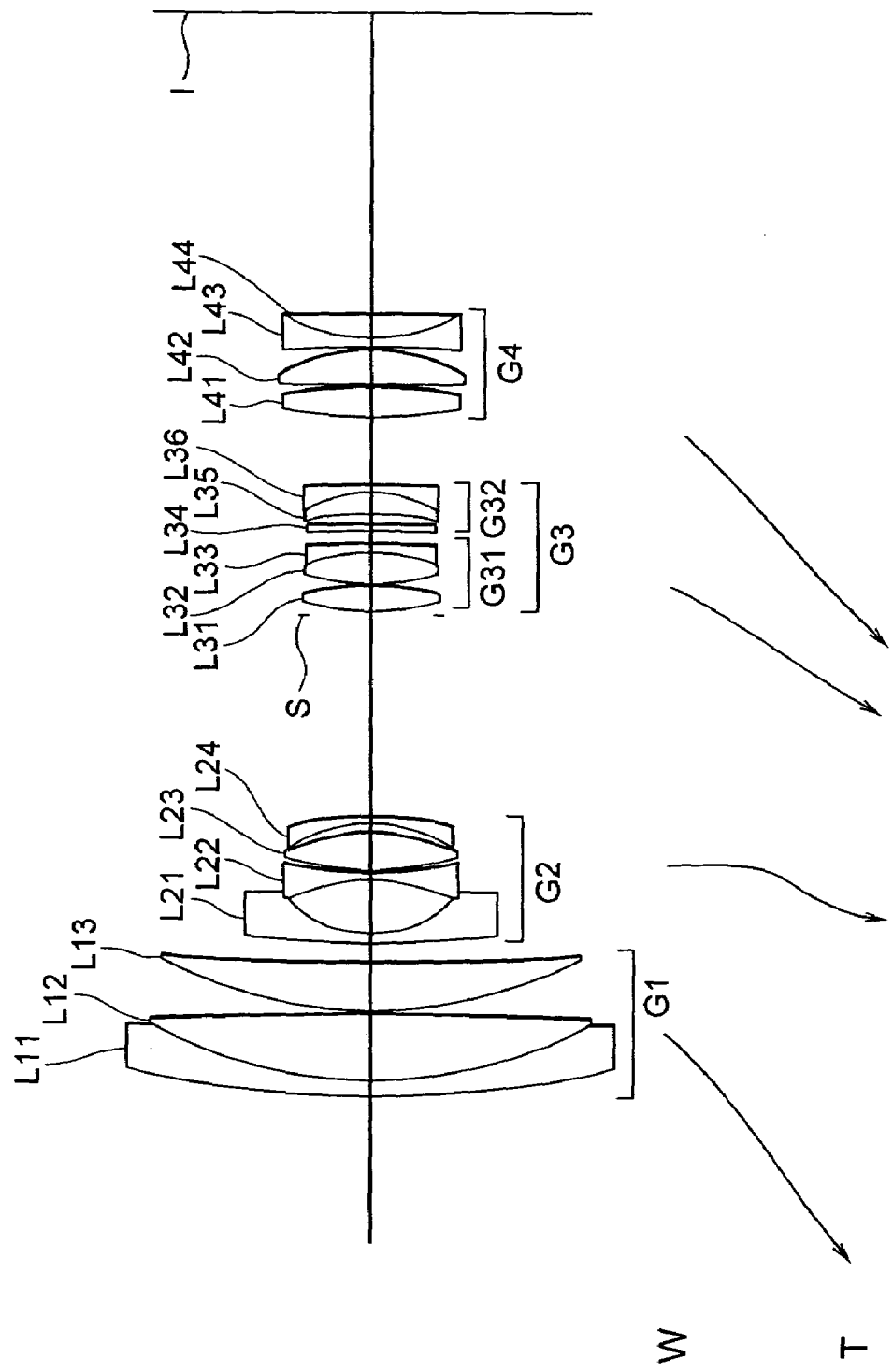

ZOOM LENS SYSTEM WITH VIBRATION REDUCTION

The disclosures of the following priority applications are herein incorporated by reference:

Japanese Patent Application No. 2004-290346 filed on Oct. 1, 2004 and

Japanese Patent Application No. 2005-102731 filed on Mar. 31, 2005.

BACKGROUND OF THE INVENTION

1. Field of the Invention

The present invention relates to a zoom lens system with a vibration reduction, in particular, to a zoom lens system having a long back focal length, a high zoom ratio, and a large angle of view in the wide-angle end state suitable for a single-lens-reflex camera.

2. Related Background Art

Various kinds of zoom lens systems with a vibration reduction have been proposed in Japanese Patent Application Laid-Open Nos. 2001-166208, 2002-6217, 2003-140048, and 2003-295060.

However, in each zoom lens system disclosed in Japanese Patent Application Laid-Open Nos. 2001-166208, 2002-6217, 2003-140048, and 2003-295060, the back focal length in the wide-angle end state is 1.7 times or less of the focal length in the wide-angle end state. Accordingly, when these zoom lens systems are used for a single-lens-reflex camera necessary to have a long back focal length or, in particular, for a single-lens-reflex digital camera using a solid-state imaging device having a smaller image size than a 35 mm film format (36 mm by 24 mm) necessary to have a back focal length similar to a single-lens-reflex camera of a 35 mm film format, it causes problems that a sufficiently wide angle of view cannot be obtained, or the rear part of the zoom lens system interferes a mirror of a single-lens-reflex camera.

SUMMARY OF THE INVENTION

The present invention is made in view of the aforementioned problems and has an object to provide a zoom lens system with a vibration reduction having a long back focal length capable of being used for a single-lens-reflex digital camera, a high zoom ratio of about ten, and an angle of view of about 70 degrees or more in the wide-angle end state.

According to a first aspect of the present invention, a zoom lens system with a vibration reduction comprising, in order from an object, a first lens group having positive refractive power, a second lens group having negative refractive power, a third lens group having positive refractive power, and a fourth lens group having positive refractive power. When a state of lens group positions varies from a wide-angle end state to a telephoto end state, a distance between the first lens group and the second lens group increases, a distance between the second lens group and the third lens group decreases, and a distance between the third lens group and the fourth lens group varies. The third lens group is composed of, in order from an object, a front lens group having positive refractive power and a rear lens group having negative refractive power. An image blur caused by a camera shake is corrected by shifting only the rear lens group in the direction substantially perpendicular to an optical axis.

In one preferred embodiment of the first aspect of the present invention, the following conditional expression (1) is preferably satisfied:

$$3.5 < f1/fw < 8.0 \qquad (1)$$

where f1 denotes the focal length of the first lens group and fw denotes the focal length of the zoom lens system in the wide-angle end state.

In one preferred embodiment of the first aspect of the present invention, the following conditional expression (2) is preferably satisfied:

$$1.70 < Bfw/fw < 3.00 \qquad (2)$$

where Bfw denotes the back focal length in the wide-angle end state.

In one preferred embodiment of the first aspect of the present invention, the following conditional expressions (3) and (4) are preferably satisfied:

$$1.6 < f3/fw < 4.5 \qquad (3)$$

$$-2.3 < f3R/f3F < -1.2 \qquad (4)$$

where f3 denotes the focal length of the third lens group, f3F denotes the focal length of the front lens group, and f3R denotes the focal length of the rear lens group.

In one preferred embodiment of the first aspect of the present invention, when a state of lens group positions varies from a wide-angle end state to a telephoto end state, the first lens group, the third lens group, and the fourth lens group preferably move to the object.

In one preferred embodiment of the first aspect of the present invention, a distance between the third lens group and the fourth lens group in the wide-angle end state is preferably larger than that in the telephoto end state.

In one preferred embodiment of the first aspect of the present invention, the following conditional expression (5) is preferably satisfied:

$$0.80 < f3/f4 < 1.60 \qquad (5)$$

where f3 denotes the focal length of the third lens group and f4 denotes the focal length of the fourth lens group.

In one preferred embodiment of the first aspect of the present invention, the following conditional expression (6) is preferably satisfied:

$$-0.90 < fw/Re < 0.20 \qquad (6)$$

where Re denotes a radius of curvature of the most image side lens surface of the zoom lens system.

In one preferred embodiment of the first aspect of the present invention, the rear lens group is preferably composed of a cemented lens constructed by, in order from the object, a double concave negative lens cemented with a positive meniscus lens having a convex surface facing to the object.

In one preferred embodiment of the first aspect of the present invention, the most object side lens surface of the rear lens group is preferably an aspherical surface.

In one preferred embodiment of the first aspect of the present invention, the rear lens group is preferably composed of, in order from the object, a positive meniscus lens having a concave surface facing to the object and a double concave negative lens.

In one preferred embodiment of the first aspect of the present invention, the fourth lens group includes, in order from the object, a double convex positive lens having an aspherical surface facing to the object, a positive lens having a convex surface facing to the image, and a double concave negative lens.

In one preferred embodiment of the first aspect of the present invention, focusing from infinity to a close object is carried out by moving the second lens group to the object and the following conditional expression (7) is preferably satisfied:

$$-0.95 < M2t < -0.70 \tag{7}$$

where M2t denotes a magnification of the second lens group in the telephoto end state.

According to a second aspect of the present invention, a zoom lens system with a vibration reduction comprising, in order from an object, a first lens group having positive refractive power, a second lens group having negative refractive power, a third lens group having positive refractive power, and a fourth lens group having positive refractive power. Zooming is carried out by varying distances between respective lens groups. The third lens group is composed of, in order from the object, a front lens group having positive refractive power and a rear lens group having negative refractive power. Variation in focusing position is corrected by shifting only the rear lens group in the direction substantially perpendicular to the optical axis. At least one lens surface in the rear lens group is an aspherical surface having a shape that positive refractive power becomes stronger or negative refractive power becomes weaker from the optical axis to the periphery than a spherical surface having a paraxial radius of curvature. The following conditional expression (8) is satisfied:

$$3.7 < f1/fw < 7.0 \tag{8}$$

where f1 denotes the focal length of the first lens group and fw denotes the focal length of the zoom lens system in the wide-angle end state.

In one preferred embodiment of the second aspect of the present invention, the following conditional expressions (9), (10), (11), and (12) are preferably satisfied:

$$1.6 < f3/fw < 3.5 \tag{9}$$

$$0.0001 \times (h/2) < |X50| < 0.1 \times (h/2) \tag{10}$$

$$0.0001 \times (h/2) < |Xm| < 0.01 \times (h/2) \tag{11}$$

$$|X50|/|Xm| < 1 \tag{12}$$

where f3 denotes the focal length of the third lens group, h denotes an effective diameter of the aspherical surface, X50 denotes a deviation of the aspherical shape relative to the spherical shape of the paraxial radius of curvature at the 50% height of the effective diameter from the optical axis of the aspherical surface, and Xm denotes a deviation of the aspherical shape relative to the spherical shape of the paraxial radius of curvature at the 100% height of the effective diameter from the optical axis of the aspherical surface.

In one preferred embodiment of the second aspect of the present invention, it is preferable that the most object side lens in the fourth lens group is a positive lens and the image side surface of the positive lens is a convex shape facing to the image.

In one preferred embodiment of the second aspect of the present invention, upon zooming from the wide-angle end state to the telephoto end state, the first lens group, the third lens group and the fourth lens group preferably move to the object.

In one preferred embodiment of the second aspect of the present invention, a distance between the third lens group and the fourth lens group in the wide-angle end state is preferably larger than that in the telephoto end state.

In one preferred embodiment of the second aspect of the present invention, the following conditional expression (4) is preferably satisfied:

$$-2.3 < f3R/f3F < -1.2 \tag{4}$$

where f3F denotes the focal length of the front lens group and f3R denotes the focal length of the rear lens group.

In one preferred embodiment of the second aspect of the present invention, the following conditional expressions (13) and (14) are preferably satisfied:

$$0.90 < f3/f4 < 1.60 \tag{13}$$

$$1.80 < Bfw/fw < 3.00 \tag{14}$$

where f3 denotes the focal length of the third lens group, f4 denotes the focal length of the fourth lens group, and Bfw denotes the back focal length in the wide-angle end state.

In one preferred embodiment of the second aspect of the present invention, an aperture stop is preferably disposed between the second lens group and the third lens group and the following conditional expression (15) is preferably satisfied:

$$0.15 < Ds/f3 < 0.30 \tag{15}$$

where f3 denotes the focal length of the third lens group and Ds denotes a distance between the aperture stop and the most object side lens surface of the rear lens group along the optical axis.

In one preferred embodiment of the second aspect of the present invention, the following conditional expression (6) is preferably satisfied:

$$-0.90 < fw/Re < 0.20 \tag{6}$$

where Re denotes a radius of curvature of the most image side lens surface of the zoom lens system.

In one preferred embodiment of the second aspect of the present invention, the fourth lens group preferably has at least one cemented lens and the cemented surface of the cemented lens has a convex shape facing to the image.

Other features and advantages according to the invention will be readily understood from the detailed description of the preferred embodiment in conjunction with the accompanying drawings.

BRIEF DESCRIPTION OF THE DRAWINGS

FIG. 1 is a diagram showing the lens configuration of a zoom lens system with a vibration reduction according to Example 1 of the present invention.

FIG. 21 is a diagram showing the lens configuration of a zoom lens system with a vibration reduction according to Example 6 of the present invention.

DESCRIPTION OF THE MOST PREFERRED EMBODIMENTS

Figure 2A:
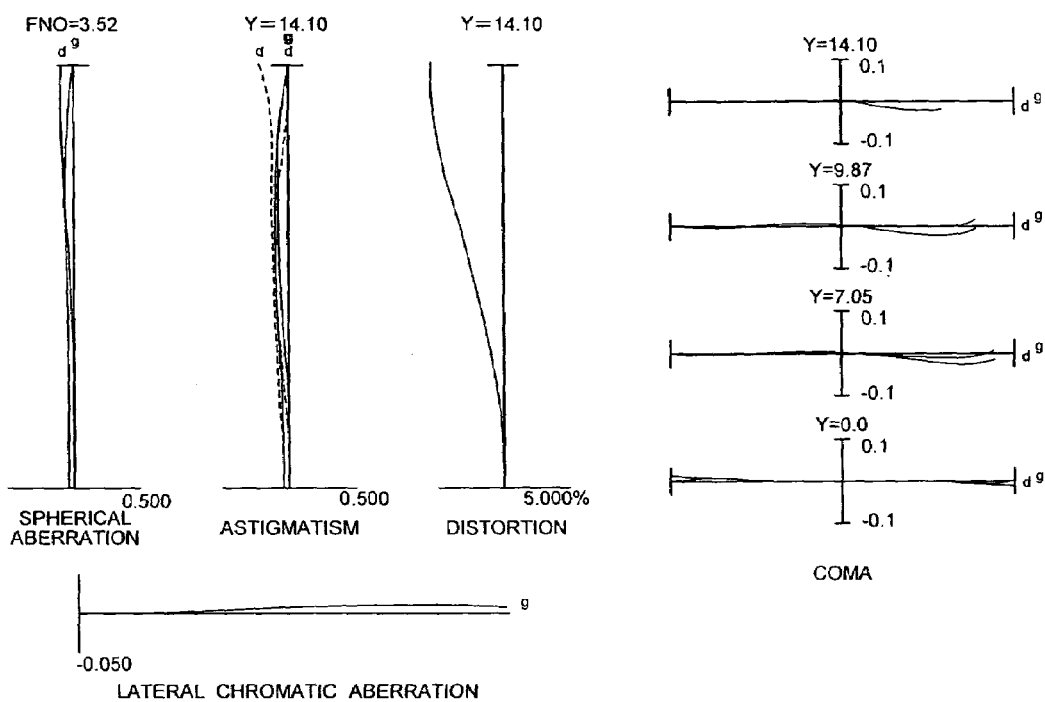
FIGS. 2A and 2B are graphs showing various aberrations of the zoom lens system with a vibration reduction according to Example 1 of present invention in the wide-angle end state upon focusing on infinity and lateral aberrations in meridional image plane upon correcting rotational image blur of 0.60 degrees, respectively.

A zoom lens system with a vibration reduction according to the present invention includes, in order from an object, a first lens group having positive refractive power, a second lens group having negative refractive power, a third lens group having positive refractive power, and a fourth lens group having positive refractive power. When a state of lens group positions varies from a wide-angle end state to a telephoto end state, a distance between the first lens group and the second lens group increases, a distance between the second lens group and the third lens group decreases, and a distance between the third lens group and the fourth lens group varies. The third lens group is composed of, in order from the object, a front lens group having positive refractive power and a rear lens group having negative refractive power. Upon happening a camera shake, an image blur is corrected by shifting only the rear lens group substantially perpendicularly to the optical axis.

Since the lens diameter of the third lens group can be made smaller than that of the other lens groups, the third lens group is suitable for installing a vibration reduction mechanism. When the third lens group is composed of, in order from the object, a front lens group having positive refractive power and a rear lens group having negative refractive power and when only the rear lens group is used for a vibration reduction lens, the vibration reduction mechanism can be made compact and light. With this power arrangement, deterioration in optical performance upon shifting the rear lens group for vibration reduction substantially perpendicularly to the optical axis can be made small.

In a zoom lens system with a vibration reduction according to the present invention, the following conditional expression (1) is preferably satisfied:

$$3.5 < f1/fw < 8.0 \qquad (1)$$

where fw denotes the focal length of the zoom lens system in the wide-angle end state and f1 denotes the focal length of the first lens group.

Conditional expression (1) defines an appropriate range of the focal length of the first lens group suitable for securing the back focal length and optical performance. When the ratio f1/fw is equal to or exceeds the upper limit of conditional expression (1), the total lens length and the lens diameter of the zoom lens system become large, so that it becomes difficult to be in practical use. On the other hand, when the ratio f1/fw is equal to or falls below the lower limit of conditional expression (1), the back focal length tends to become short and optical performance in the telephoto end state becomes worse.

In the zoom lens system with a vibration reduction according to the present invention, in order to secure the effect of the invention, it is preferable to set the upper limit of conditional expression (1) to 7.0 and the lower limit to 3.8.

In the zoom lens system with a vibration reduction according to the present invention, the following conditional expression (2) is preferably satisfied:

$$1.70 < Bfw/fw < 3.00 \qquad (2)$$

where fw denotes the focal length of the zoom lens system in the wide-angle end state, and Bfw denotes the back focal length in the wide-angle end state.

Conditional expression (2) defines an appropriate range of the back focal length suitable for an interchangeable lens type single-lens-reflex digital camera. When the ratio Bfw/fw is equal to or exceeds the upper limit of conditional expression (2), the back focal length becomes too long, so that the total lens length becomes large. On the other hand, when the ratio Bfw/fw is equal to or falls below the lower limit of conditional expression (2), the back focal length becomes short, so that the rear portion of the zoom lens system interferes the mirror of the single-lens-reflex camera.

In the zoom lens system with a vibration reduction according to the present invention, in order to secure the effect of the present invention, it is preferable to set the upper limit of conditional expression (2) to 2.50 and the lower limit to 1.85.

In the zoom lens system with a vibration reduction according to the present invention, the following conditional expressions (3) and (4) are preferably satisfied:

$$1.6 < f3/fw < 4.5 \qquad (3)$$

$$-2.3 < f3R/f3F < -1.2 \qquad (4)$$

where f3 denotes the focal length of the third lens group, f3F denotes the focal length of the front lens group and f3R denotes the focal length of the rear lens group.

Conditional expression (3) defines an appropriate range of the focal length of the third lens group suitable for mitigating deterioration in optical performance caused by fabrication error. When the ratio f3/fw is equal to or exceeds the upper limit of conditional expression (3), the total lens length and lens diameter of the zoom lens system becomes excessively large, so that it becomes difficult to be in practical use. On the other hand, when the ratio f3/fw is equal to or falls below the lower limit of conditional expression (3), the back focal length becomes short and deterioration in optical performance caused by decentering between the front lens group of the third lens group and the fourth lens group resulting from fabrication error becomes large.

In the zoom lens system with a vibration reduction according to the present invention, in order to secure the effect of the present invention, it is preferable to set the upper limit of conditional expression (3) to 3.5 and the lower limit to 1.8.

Conditional expression (4) defines the ratio of the focal length of the rear lens group to that of the front lens group suitable for making the zoom lens system as a vibration reduction lens. When the ratio f3R/f3F is equal to or exceeds the upper limit of conditional expression (4), the focal length of the rear lens group movable perpendicularly to the optical axis upon vibration reduction becomes large, so that moving amount of the rear lens group upon vibration reduction becomes large. Accordingly, the driver for the vibration reduction mechanism becomes large. On the other hand, when the ratio f3R/f3F is equal to or falls below the lower limit of conditional expression (4), the focal length of the rear lens group becomes short, so that when the rear lens group is decentered upon vibration reduction, deterioration in optical performance becomes large because of largely producing coma.

In the zoom lens system with a vibration reduction according to the present invention, in order to secure the effect of the present invention, it is preferable to set the upper limit of conditional expression (4) to −1.3 and the lower limit to −2.1.

In the zoom lens system with a vibration reduction according to the present invention, when a state of lens group positions varies from the wide-angle end state to the telephoto end state, it is preferable that the first lens group, the third lens group, and the fourth lens group move to the object.

In the zoom lens system with a vibration reduction according to the present invention, it is preferable that a distance between the third lens group and the fourth lens group in the wide-angle end state is wider than that in the telephoto end state.

In the zoom lens system with a vibration reduction according to the present invention, the following conditional expression (5) is preferably satisfied:

$$0.80 < f3/f4 < 1.60 \qquad (5)$$

where f3 denotes the focal length of the third lens group and f4 denotes the focal length of the fourth lens group.

Conditional expression (5) defines an appropriate range of the ratio of the focal length of the third lens group to that of the fourth lens group suitable for securing the back focal length and mitigating deterioration in optical performance caused by fabrication error. When the ratio f3/f4 is equal to or exceeds the upper limit of conditional expression (5), the focal length of the fourth lens group becomes relatively shorter than that of the third lens group. Accordingly, when decentering between the front lens group and the fourth lens group is occurred by fabrication error, deterioration in optical performance becomes large. On the other hand, when the ratio f3/f4 is equal to or falls below the lower limit of conditional expression (5), the focal length of the third lens group becomes relatively shorter than that of the fourth lens group. As a result, the back focal length becomes short.

In the zoom lens system with a vibration reduction according to the present invention, in order to secure the effect of the present invention, it is preferable to set the upper limit of conditional expression (5) to 1.40 and the lower limit to 0.90.

In the zoom lens system with a vibration reduction according to the present invention, the following conditional expression (6) is preferably satisfied:

$$-0.90 < fw/Re < 0.20 \qquad (6)$$

where Re denotes the radius of curvature of the most image side lens surface of the zoom lens system.

Conditional expression (6) defines an appropriate range of the radius of curvature of the most image side lens surface of the zoom lens system, the end lens surface, suitable for preferably correcting various aberrations and suppressing ghost images. When the sign of conditional expression (6) is positive, the end lens surface becomes a concave surface facing to the image. When the sign is negative, the end lens surface becomes a convex surface facing to the image. When the ratio fw/Re is equal to or exceeds the upper limit of conditional expression (6), the end lens surface becomes a concave surface having a large radius of curvature. Accordingly, when the reflected light from the image plane is reflected again by the end lens surface to form a ghost image, the reflected light from the end lens surface is converged to reach the image plane, so that the ghost image becomes conspicuous. On the other hand, when the ratio fw/Re is equal to or falls below the lower limit of conditional expression (6), the end lens surface becomes convex surface having a large radius of curvature. Accordingly, it becomes difficult to preferably correct various aberrations.

In the zoom lens system with a vibration reduction according to the present invention, in order to secure the effect of the present invention, it is preferable to set the upper limit of conditional expression (6) to 0.15 and the lower limit to −0.70.

In the zoom lens system with a vibration reduction according to the present invention, the rear lens group is preferably composed of a cemented lens constructed by, in order from the object, a double concave negative lens cemented with a positive meniscus lens having a convex surface facing to the object. With this construction, deterioration in optical performance upon decentering the rear lens group for vibration reduction can be mitigated.

In the zoom lens system with a vibration reduction according to the present invention, the rear lens group is preferably composed of, in order from the object, a positive meniscus lens having a concave surface facing to the object and a double concave negative lens.

With this construction, deterioration in optical performance upon decentering the rear lens group for vibration reduction can be mitigated.

In the zoom lens system with a vibration reduction according to the present invention, the rear lens group is preferably composed of a cemented lens constructed by, in order from the object, a positive meniscus lens having a concave surface facing to the object cemented with a double concave negative lens.

With this construction, deterioration in optical performance upon decentering the rear lens group for vibration reduction can be further mitigated.

In the zoom lens system with a vibration reduction according to the present invention, the most object side lens surface is preferably an aspherical surface.

With this construction, deterioration in optical performance upon decentering the rear lens group for vibration reduction can be further mitigated.

In the zoom lens system with a vibration reduction according to the present invention, the rear lens group is preferably composed of, in order from the object, a first negative lens, a cemented lens constructed by a positive meniscus lens having a concave surface facing to the object cemented with a second negative lens having a concave surface facing to the object.

With this construction, deterioration in optical performance upon decentering the rear lens group for vibration reduction can be mitigated.

In the zoom lens system with a vibration reduction according to the present invention, the fourth lens group preferably includes, in order from the object, a double convex positive lens having an aspherical surface facing to the object, a positive lens having a convex surface facing to the image, and a double concave negative lens.

With this construction, various aberrations can be preferably corrected.

In the zoom lens system with a vibration reduction according to the present invention, the fourth lens group is preferably composed of, in order from the object, a double convex positive lens having an aspherical surface facing to the object, a cemented lens constructed by a double convex positive lens cemented with a double concave negative lens, and a positive meniscus lens having a concave surface facing to the object.

With this construction, various aberrations can be preferably corrected.

In the zoom lens system with a vibration reduction according to the present invention, upon focusing from infinity to a close object, the second lens group is preferably moved to the object.

In the focusing method, since the lens group to be driven for focusing is small, it is advantageous for the drive mechanism to be compact and labor saving upon carrying out auto focusing. In addition, it is advantageous that the marginal ray tends not to be blocked out upon focusing on a close object.

In the zoom lens system with a vibration reduction according to the present invention, the following conditional expression (7) is preferably satisfied:

$$-0.95 < M2t < -0.70 \qquad (7)$$

where M2t denotes the magnification of the second lens group in the telephoto end state.

Conditional expression (7) defines an appropriate range of the magnification of the second lens group in the telephoto end state suitable in the case of carrying out focusing by the second lens group. When the value M2t is equal to or exceeds the upper limit of conditional expression (7), it becomes difficult to obtain a sufficiently high magnification. On the other hand, when the value M2t is equal to or falls below the lower limit of conditional expression (7), it becomes impossible to carry out focusing in the telephoto end state. Otherwise, the moving amount of the second lens group in the telephoto end state becomes too large, so that it becomes difficult to focus on a sufficiently close object.

Incidentally, zoom lens systems with a vibration reduction according to the present invention seen from another point of view are explained blow.

A zoom lens system with a vibration reduction according to the present invention seen from another point of view is composed of, in order from an object, a first lens group having positive refractive power, a second lens group having negative refractive power, a third lens group having positive refractive power, and a fourth lens group having positive refractive power. Zooming is carried out by varying distances between respective lens groups. In the zoom lens system with a vibration reduction according to the present invention, the third lens group is composed of, in order from the object, a front lens group having positive refractive power and a rear lens group having negative refractive power. Variation in an imaging position is corrected by shifting only the rear lens group in the direction perpendicular to the optical axis. At least one lens surface of the rear lens group is an aspherical surface having a shape that positive refractive power becomes stronger or negative refractive power becomes weaker from the optical axis to the periphery than a spherical surface having a paraxial radius of curvature. The following conditional expression (8) is satisfied:

$$3.7 < f1/fw < 7.0 \quad (8)$$

where f1 denotes the focal length of the first lens group and fw denotes the focal length of the zoom lens system in the wide-angle end state.

Since the lens diameter of the third lens group can be made smaller than that of the other lens groups, the third lens group is suitable for installing the vibration reduction mechanism. When the third lens group is composed of, in order from the object, a front lens group having positive refractive power and a rear lens group having negative refractive power and when only the rear lens group is used for a vibration reduction lens, the vibration reduction mechanism can be made compact and light. By carrying out a vibration reduction with the rear lens group having negative refractive power disposed in the third lens group having positive refractive power, variation in coma upon vibration reduction can be kept in low level. Moreover, when such power distribution and at least on aspherical surface are introduced in the rear lens group that is a vibration reduction lens group, deterioration in optical performance upon shifting the vibration reduction lens group in the direction perpendicular to the optical axis can be suppressed.

Conditional expression (8) defines an appropriate range of the focal length of the first lens group suitable for securing the back focal length and optical performance. When the ratio f1/fw is equal to or exceeds the upper limit of conditional expression (8), the total lens length and the lens diameter of the zoom lens system become large, so that it becomes difficult to be in practical use. On the other hand, when the ratio f1/fw is equal to or falls blow the lower limit of conditional expression (8), the back focal length tends to become short and various aberrations produces in the telephoto end state upon making the zoom ratio large, so that optical performance becomes worse.

In order to secure the effect of the present invention, it is preferable to set the upper limit of conditional expression (8) to 6.0 and the lower limit to 3.8.

In a zoom lens system with a vibration reduction according to the present invention seen from another point of view, the following conditional expressions (9), (10), (11), and (12) are preferably satisfied:

$$1.6 < f3/fw < 3.5 \quad (9)$$

$$0.0001 \times (h/2) < |X50| < 0.01 \times (h/2) \quad (10)$$

$$0.0001 \times (h/2) < |Xm| < 0.01 \times (h/2) \quad (11)$$

$$|X50|/|Xm| < 1 \quad (12)$$

where f3 denotes the focal length of the third lens group, h denotes an effective diameter of the aspherical surface, X50 denotes a deviation of the aspherical shape relative to the spherical shape of the paraxial radius of curvature at the 50% height of the effective diameter from the optical axis of the aspherical surface, and Xm denotes a deviation of the aspherical shape relative to the spherical shape of the paraxial radius of curvature at the 100% height of the effective diameter from the optical axis of the aspherical surface.

Conditional expression (9) defines an appropriate range of the focal length of the third lens group suitable for mitigating deterioration in optical performance caused by fabrication error. When the ratio f3/fw is equal to or exceeds the upper limit of conditional expression (9), the total lens length and the lens diameter of the zoom lens system becomes excessively large, so that it becomes difficult to be in practical use. On the other hand, when the ratio f3/fw is equal to or falls below the lower limit of conditional expression (9), the back focal length becomes short and deterioration in optical performance caused by decentering between the front lens group of the third lens group and the fourth lens group resulting from fabrication error becomes large.

In order to secure the effect of the present invention, it is preferable to set the upper limit of conditional expression (9) to 3.0 and the lower limit to 1.8.

Conditional expressions (10), (11), and (12) defines the shape of the aspherical surface for suppressing deterioration in optical performance upon shifting the vibration reduction lens group in the direction perpendicular to the optical axis. When the values |X50| and |Xm| are equal to or fall below the lower limit of respective conditional expressions (10) and (11), the aspherical surface cannot be effective and the number of lens elements becomes large for correcting various aberrations, so that it is undesirable. On the other hand, when the values |X50| and |Xm| are equal to or exceeds the upper limit of respective conditional expressions (10) and (11), correction of coma and the like becomes over correction and deterioration in optical performance upon shifting the vibration reduction lens group becomes large.

When at least one lens surface of the rear lens group, which is the vibration reduction lens group, is an aspherical surface having a shape that positive refractive power becomes stronger or negative refractive power becomes weaker from the optical axis to the periphery than a spherical surface having a paraxial radius of curvature, various aberrations of on-axis and off-axis bundle of rays can be corrected effectively.

In order to secure the effect of the present invention, it is preferable to set the upper limit of conditional expression (10) to 0.005×(h/2) and lower limit to 0.0002×(h/2).

In order to secure the effect of the present invention, it is preferable to set the upper limit of conditional expression (11) to 0.007×(h/2) and lower limit to 0.0005×(h/2).

When the ratio |X50|/|Xm| is equal to or exceeds the upper limit of conditional expression (12), high order aberrations are produced in the vibration reduction lens group upon shifting the vibration reduction lens group, so that deterioration in optical performance becomes large.

In order to secure the effect of the present invention, it is preferable to set the upper limit of conditional expression (12) to 0.8.

In a zoom lens system with a vibration reduction according to the present invention seen from another point of view, in order to make the zoom lens system compact, the first lens group, the third lens group, and the fourth lens group are preferably moved to the object upon zooming from the wide-angle end state to the telephoto end state.

In a zoom lens system with a vibration reduction according to the present invention seen from another point of view, in order to obtain preferable optical performance over entire zoom range, a distance between the third lens group and the fourth lens group in the wide-angle end state is preferably larger than that in the telephoto end state.

In the zoom lens system with a vibration reduction according to the present invention seen from another point of view, the following conditional expressions (13) and (14) are preferably satisfied:

$$0.90 < f3/f4 < 1.60 \tag{13}$$

$$1.80 < Bfw/fw < 3.00 \tag{14}$$

where f4 denotes the focal length of the fourth lens group and Bfw denotes the back focal length in the wide-angle end state.

Conditional expression (13) defines an appropriate range of the ratio of the focal length of the third lens group to that of the fourth lens group suitable for securing the back focal length and mitigating deterioration in optical performance caused by fabrication error. When the ratio f3/f4 is equal to or exceeds the upper limit of conditional expression (13), the focal length of the fourth lens group becomes relatively shorter. Accordingly, when decentering between the front lens group and the fourth lens group is occurred by fabrication error, deterioration in optical performance becomes large. On the other hand, when the ratio f3/f4 is equal to or falls below the lower limit of conditional expression (13), the focal length of the third lens group becomes relatively short. As a result, the back focal length becomes short.

In the zoom lens system with a vibration reduction according to the present invention seen from another point of view, in order to secure the effect of the present invention, it is preferable to set the upper limit of conditional expression (13) to 1.50 and the lower limit to 1.00.

Conditional expression (14) defines an appropriate range of the back focal length suitable for an interchangeable lens type single-lens-reflex digital camera. When the ratio Bfw/fw is equal to or exceeds the upper limit of conditional expression (14), the back focal length becomes too long, so that the total lens length becomes large. On the other hand, when the ratio Bfw/fw is equal to or falls below the lower limit of conditional expression (14), the back focal length becomes short, so that the rear portion of the zoom lens system interferes the mirror of the single-lens-reflex camera.

In the zoom lens system with a vibration reduction according to the present invention seen from another point of view, in order to secure the effect of the present invention, it is preferable to set the upper limit of conditional expression (14) to 2.50 and the lower limit to 1.90.

In the zoom lens system with a vibration reduction according to the present invention seen from another point of view, an aperture stop is disposed between the second lens group and the third lens group, and the following conditional expression (15) is preferably satisfied:

$$0.15 < Ds/f3 < 0.30 \tag{15}$$

where Ds denotes a distance between the aperture stop and the most object side lens surface of the rear lens group along the optical axis.

Conditional expression (15) defines an appropriate range of the position of the vibration reduction lens group. When the ratio Ds/f3 is equal to or falls below the lower limit of conditional expression (15), the distance between the aperture stop and the vibration reduction lens group becomes large, so that correction of aberrations by the vibration reduction lens group becomes worse. On the other hand, when the ratio Ds/f3 is equal to or exceeds the upper limit of conditional expression (15), the distance between the aperture stop and the vibration reduction lens group becomes small, so that it tends to bring interference between the mechanism for the aperture stop and the vibration reduction mechanism.

In order to secure the effect of the present invention, it is preferable to set the upper limit of conditional expression (15) to 0.26 and the lower limit to 0.18.

In the zoom lens system with a vibration reduction according to the present invention seen from another point of view, the most object side lens surface of the rear lens group preferably has a convex shape facing to the image.

With this construction, the incident angle of off-axis ray incident on the vibration reduction lens group can be made gentle and production of coma upon shifting the rear lens group for the vibration reduction can be suppressed.

In the zoom lens system with a vibration reduction according to the present invention seen from another point of view, the most object side lens in the fourth lens group is a positive lens and the image side of the positive lens preferably has a convex shape facing to the object. With this construction, ghost images produced by the reflection light from the image plane can be suppressed.

Since the vibration reduction lens group has negative refractive power, by disposing a positive lens adjacent to the image side thereof, various aberrations produced upon vibration reduction can be preferably corrected.

In order to retain aberrations in a well corrected state upon vibration correction, it becomes necessary to preferably correct aberrations not only to the vibration reduction lens group but also to a lens group disposed to the image side of the vibration reduction lens group. Accordingly, the image side surface of the positive lens is made to be a convex shape facing to the image. With this construction, the exit angle of the light come out from the image side lens surface can be kept small, so that deterioration in optical performance upon decentering the rear lens group for the vibration reduction can be mitigated.

In the zoom lens system with a vibration reduction according to the present invention seen from another point of view, the most object side lens in the fourth lens group is preferably a double convex positive lens at least one surface of which is an aspherical surface.

With this construction, deterioration in optical performance upon decentering for the vibration reduction can be further suppressed with securing strong positive refractive power.

In the zoom lens system with a vibration reduction according to the present invention seen from another point of view, it is preferable that the fourth lens group includes at least one cemented lens and the cemented surface of the cemented lens has a convex shape facing to the image.

With this construction, chromatic aberration of the off-axis ray can be preferably corrected and the exit angle of the light come out from the cemented surface can be kept small, so that various aberrations can be preferably corrected.

A zoom lens system with a vibration reduction according to each example of the present invention is explained below with reference to accompanying drawings.

EXAMPLE 1

FIG. 1 is a diagram showing the lens configuration of a zoom lens system with a vibration reduction according to Example 1 of the present invention.

The zoom lens system with a vibration reduction according to Example 1 is composed of, in order from an object, a first lens group G1 having positive refractive power, a second lens group G2 having negative refractive power, an aperture stop S, a third lens group G3 having positive refractive power, and a fourth lens group G4 having positive refractive power.

In the zoom lens system with a vibration reduction according to Example 1, when a state of lens group positions varies from a wide-angle end state to a telephoto end state, the first lens group G1, the third lens group G3, and the fourth lens group G4 move to the object and the second lens group G2 moves such that a distance between the first lens group G1 and the second lens group G2 increases, a distance between the second lens group G2 and the third lens group G3 decreases, and a distance between the third lens group G3 and the fourth lens group G4 decreases.

The first lens group G1 is composed of, in order from the object, a cemented lens constructed by a negative meniscus lens L11 having a convex surface facing to the object cemented with a double convex positive lens L12, and a positive meniscus lens L13 having a convex surface facing to the object.

The second lens group G2 is composed of, in order from the object, a negative meniscus lens L21 having a convex surface facing to the object, a double concave negative lens L22, a double convex positive lens L23, a negative meniscus lens L24 having a concave surface facing to the object. The negative meniscus lens L21 disposed to the most object side of the second lens group G2 is an aspherical lens forming an aspherical surface by applying a resin layer on the object side lens surface thereof.

The third lens group G3 is composed of, in order from the object, a front lens group G31 having positive refractive power and a rear lens group G32 having negative refractive power. Vibration reduction, in other words, correction of an image blur is carried out by shifting only the rear lens group G32 in the direction perpendicular to the optical axis.

The front lens group G31 is composed of, in order from the object, a double convex positive lens L31, and a cemented lens constructed by a double convex positive lens L32 cemented with a double concave negative lens L33.

The rear lens group G32 is composed of a cemented lens constructed by, in order from the object, a double concave negative lens L34 cemented with a positive meniscus lens L35 having a convex surface facing to the object. The double concave negative lens L34 disposed to the most object side of the rear lens group G32 is an aspherical lens forming an aspherical surface by applying a resin layer on the object side lens surface thereof.

The fourth lens group G4 is composed of, in order from the object, a double convex positive lens L41, a cemented lens constructed by a double convex positive lens L42 cemented with a double concave negative lens L43, and a positive meniscus lens L44 having a concave surface facing to the object. The double convex positive lens L41 disposed to the most object side of the fourth lens group G4 is an aspherical lens forming an aspherical surface on the object side lens surface thereof.

The aperture stop S is disposed between the second lens group G2 and the third lens group G3 as described above and moved together with the front lens group G31 of the third lens group G3 upon zooming from the wide-angle end state to the telephoto end state.

Focusing from infinity to a close object is carried out by moving the second lens group G2 to the object.

As described above, vibration reduction is carried out by shifting only the rear lens group G32 in the direction perpendicular to the optical axis. Here, the focal length of the zoom lens system is denoted by f, and vibration reduction coefficient is denoted by K that is the ratio of the shift amount of an image on the image plane relative to the shift amount of the shift lens group upon vibration reduction. In this case, in order to correct rotational image blur of the angle θ, the shift lens group for vibration reduction may be shifted in the direction perpendicular to the optical axis by the amount of (f·tan θ)/K.

Accordingly, in the zoom lens system with a vibration reduction according to Example 1, since the vibration reduction coefficient K is 1.115 and the focal length f is 18.50 (mm) in the wide-angle end state, in order to correct rotational image blur of 0.60 degrees, the shift amount of the rear lens group G32 becomes 0.174 (mm). In the telephoto end state, since the vibration reduction coefficient K is 2.016 and the focal length f is 194.45 (mm), in order to correct rotational image blur of 0.20 degrees, the shift amount of the rear lens group G32 becomes 0.337 (mm).

Various values associated with a zoom lens system with a vibration reduction according to Example 1 are shown in Table 1.

In [Specifications], f denotes the focal length, Bf denotes a back focal length, FNO denotes an f-number, and 2ω denotes an angle of view (unit: degrees).

In [Lens Data], the first column shows the surface number that is a lens surface counted in order from the object, the second column r denotes the radius of curvature of the lens surface, the third column d denotes a distance between the lens surfaces, the fourth column ν denotes Abbe number at d-line (λ=587.6 nm), and the fifth column n denote refractive index at d-line (λ=587.6 nm). By the way, r=∞ denotes a plane surface. Bf denotes the back focal length. Refractive index for the air=1.000000 is omitted.

In [Aspherical Data], each aspherical coefficient is shown as the aspherical surface is expressed by the following expression:

$$x = (h^2/r)/\left[1 + \{1 - \kappa(h/r)^2\}^{1/2}\right] + b \cdot h^4 + c \cdot h^6 + d \cdot h^8 + e \cdot h^{10}$$

where h denotes a height from the optical axis, x denotes a distance along the optical axis from tangent lane at the vertex of the aspherical surface to the aspherical surface at the height h, κ denotes a conical coefficient, b, c, d and e denote respective aspherical coefficients, r denotes a reference radius of curvature shown in [Lens Data].

An aspherical surface is denoted by an asterisk (*) attached to the surface number. In [Aspherical Data], "E-n" denotes "10$^{-n}$" such as "1.234E-05" means 1.234×10$^{-5}$".

In [Variable Distances], variable distances corresponding to respective focal length are shown.

In [Moving Amount upon Focusing], the moving amount δ1 of the second lens group G2 upon focusing from infinity to a close object with a shooting distance of 500 mm (600 mm in Example 4) is shown.

In the tables for various values, "mm" is generally used for the unit of length such as the focal length, the radius of curvature, and the separation between optical surfaces. However, since an optical system proportionally enlarged or reduced its dimension can be obtained similar optical performance, the unit is not necessary to be limited to "mm" and any other suitable unit can be used. The explanation of reference symbols is the same in the other example.

TABLE 1

[Specifications]

| | W | M | T |
|---|---|---|---|
| f = | 18.50 | 69.55 | 194.45 |
| FNO = | 3.52 | 5.08 | 5.88 |
| 2ω = | 77.59° | 22.23° | 8.12° |

[Lens Data]

| | r | d | ν | n |
|---|---|---|---|---|
| 1 | 140.0000 | 2.0000 | 32.35 | 1.850260 |
| 2 | 66.3969 | 8.7000 | 82.52 | 1.497820 |
| 3 | −405.8300 | 0.1000 | | |
| 4 | 59.5278 | 6.1000 | 65.47 | 1.603000 |
| 5 | 264.8699 | (d5) | | |
| 6* | 500.0000 | 0.2000 | 38.09 | 1.553890 |
| 7 | 300.0000 | 1.2000 | 46.63 | 1.816000 |
| 8 | 15.0345 | 5.9000 | | |
| 9 | −52.6734 | 1.2000 | 46.63 | 1.816000 |
| 10 | 45.9439 | 0.1000 | | |
| 11 | 30.0000 | 4.6000 | 23.78 | 1.846660 |
| 12 | −50.4359 | 1.0000 | | |
| 13 | −28.5856 | 1.0000 | 52.32 | 1.755000 |
| 14 | −185.8275 | (d14) | | |
| 15 | ∞ | 0.5000 | Aperture Stop S | |
| 16 | 34.7750 | 3.0000 | 60.09 | 1.640000 |
| 17 | −37.3372 | 0.1000 | | |
| 18 | 29.1870 | 3.6000 | 82.52 | 1.497820 |
| 19 | −24.9540 | 1.0000 | 32.35 | 1.850260 |
| 20 | 197.2081 | 3.0000 | | |
| 21* | −43.6102 | 0.0050 | 38.09 | 1.553890 |
| 22 | −43.6102 | 1.0000 | 49.61 | 1.772500 |
| 23 | 25.2115 | 1.8000 | 25.43 | 1.805180 |
| 24 | 92.1796 | (d24) | | |
| 25* | 80.0000 | 4.0000 | 55.34 | 1.677900 |
| 26 | −32.0531 | 1.5000 | | |
| 27 | 80.0000 | 3.6000 | 82.52 | 1.497820 |
| 28 | −40.0000 | 1.4000 | 37.17 | 1.834000 |
| 29 | 46.7003 | 1.8000 | | |
| 30 | −120.0000 | 2.8000 | 65.47 | 1.603000 |
| 31 | −29.3134 | (Bf) | | |

[Aspherical Data]

Surface Number 6

κ = 1.0000
b = 1.10280E−05
c = −3.56250E−08
d = 1.02120E−10
e = −1.60960E−13

Surface Number 21
Effective Diameter = 14.8 mm

κ = 0.0837
b = 7.62690E−06
c = 0.00000E+00
d = 0.00000E+00
e = 0.00000E+00

Surface Number 25

κ = −22.2603
b = −1.24410E−05
c = 0.00000E+00
d = 0.00000E+00
e = 0.00000E+00

| | W | M | T |
|---|---|---|---|
| | [Variable Distances] | | |
| f | 18.50075 | 69.54912 | 194.45435 |
| d5 | 2.40000 | 38.00000 | 60.56391 |
| d14 | 29.30000 | 11.00000 | 1.50000 |
| d24 | 10.00000 | 3.60000 | 2.00000 |
| Bf | 38.11416 | 66.22937 | 78.56798 |

TABLE 1-continued

[Moving Amount upon Focusing]

| f | 18.50 | 69.55 | 194.45 |
|---|---|---|---|
| δ1 | 1.012 | 3.022 | 9.687 |

[Values for Conditional Expressions]

| | |
|---|---|
| (1): f1/fw = | 5.470 |
| (2): Bfw/fw = | 2.060 |
| (3): f3/fw = | 2.926 |
| (4): f3R/f3F = | −1.419 |
| (5): f3/f4 = | 1.367 |
| (6): fw/Re = | −0.631 |
| (7): M2t = | −0.838 |
| (8): f1/fw = | 5.470 |
| (9): f3/fw = | 2.926 |
| (10), (11): 0.0001 × (h/2) = | 0.0007 |
| \|X50\| = | 0.0017 |
| \|Xm\| = | 0.0271 |
| 0.01 × (h/2) = | 0.074 |
| (12): \|X50\|/\|Xm\| = | 0.063 |
| (13): f3/f4 = | 1.367 |
| (14): Bfw/fw = | 2.060 |
| (15): Ds/f3 = | 0.207 |

Figure 2B:
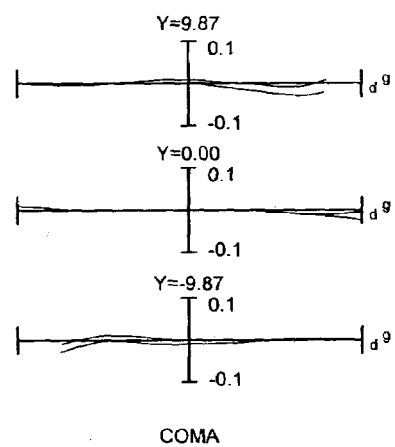

FIGS. 2A and 2B are graphs showing various aberrations of the zoom lens system with a vibration reduction according to Example 1 of the present invention in the wide-angle end state upon focusing on infinity and lateral aberrations in meridional image plane upon correcting rotational image blur of 0.60 degrees, respectively.

Figure 3:
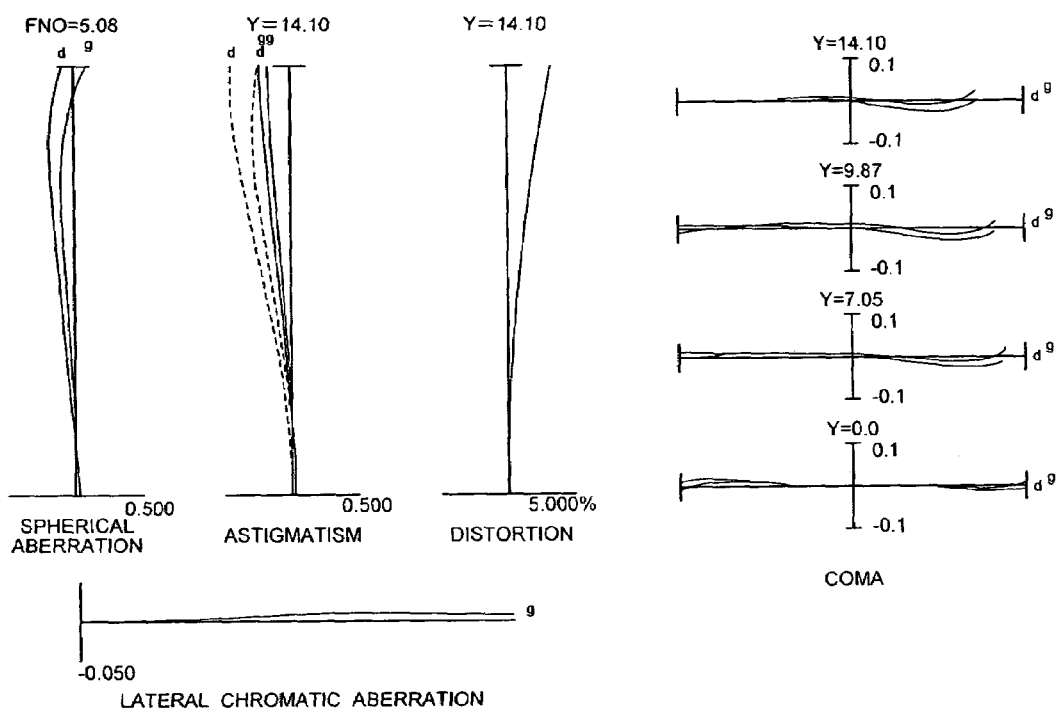
FIG. 3 is graphs showing various aberrations of the zoom lens system with a vibration reduction according to Example 1 of the present invention in the intermediate focal length state upon focusing on infinity.

FIG. 3 is graphs showing various aberrations of the zoom lens system with a vibration reduction according to Example 1 of the present invention in the intermediate focal length state upon focusing on infinity.

Figure 4A:
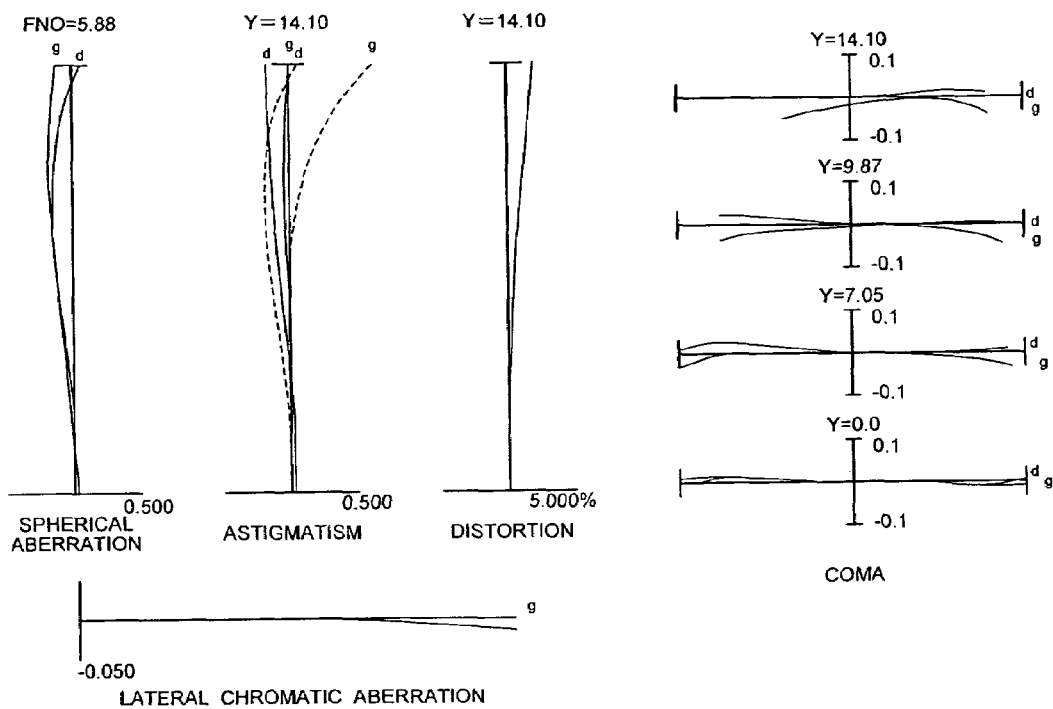
FIGS. 4A and 4B are graphs showing various aberrations of the zoom lens system with a vibration reduction according to Example 1 of the present invention in the telephoto end state upon focusing on infinity and lateral aberrations in meridional image plane upon correcting rotational image blur of 0.20 degrees, respectively.
Figure 4B:
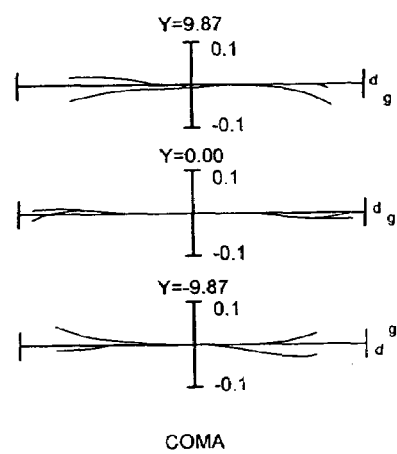

FIGS. 4A and 4B are graphs showing various aberrations of the zoom lens system with a vibration reduction according to Example 1 of the present invention in the telephoto end state upon focusing on infinity and lateral aberrations in meridional image plane upon correcting rotational image blur of 0.20 degrees, respectively.

In respective graphs, FNO denotes an f-number, Y denotes an image height. In graphs showing spherical aberration, f-number according to the full open aperture is shown. In graphs showing astigmatism and distortion, the maximum value of the image height is shown. In graphs showing coma, values of respective image heights are shown. "d" denotes aberration curve at d-line (587.6 nm), and "g" denotes aberration curve at g-line (λ=435.8 nm). In the graph showing astigmatism, a solid line indicates a sagittal image plane and a broken line indicates a meridional plane. The above-described explanation regarding various aberration graphs is the same as the other examples.

As is apparent from the respective graphs, the zoom lens system with a vibration reduction according to Example 1 shows superb optical performance as a result of good corrections to various aberrations in each focal length state from the wide-angle end state to the telephoto end state.

EXAMPLE 2

Figure 5:
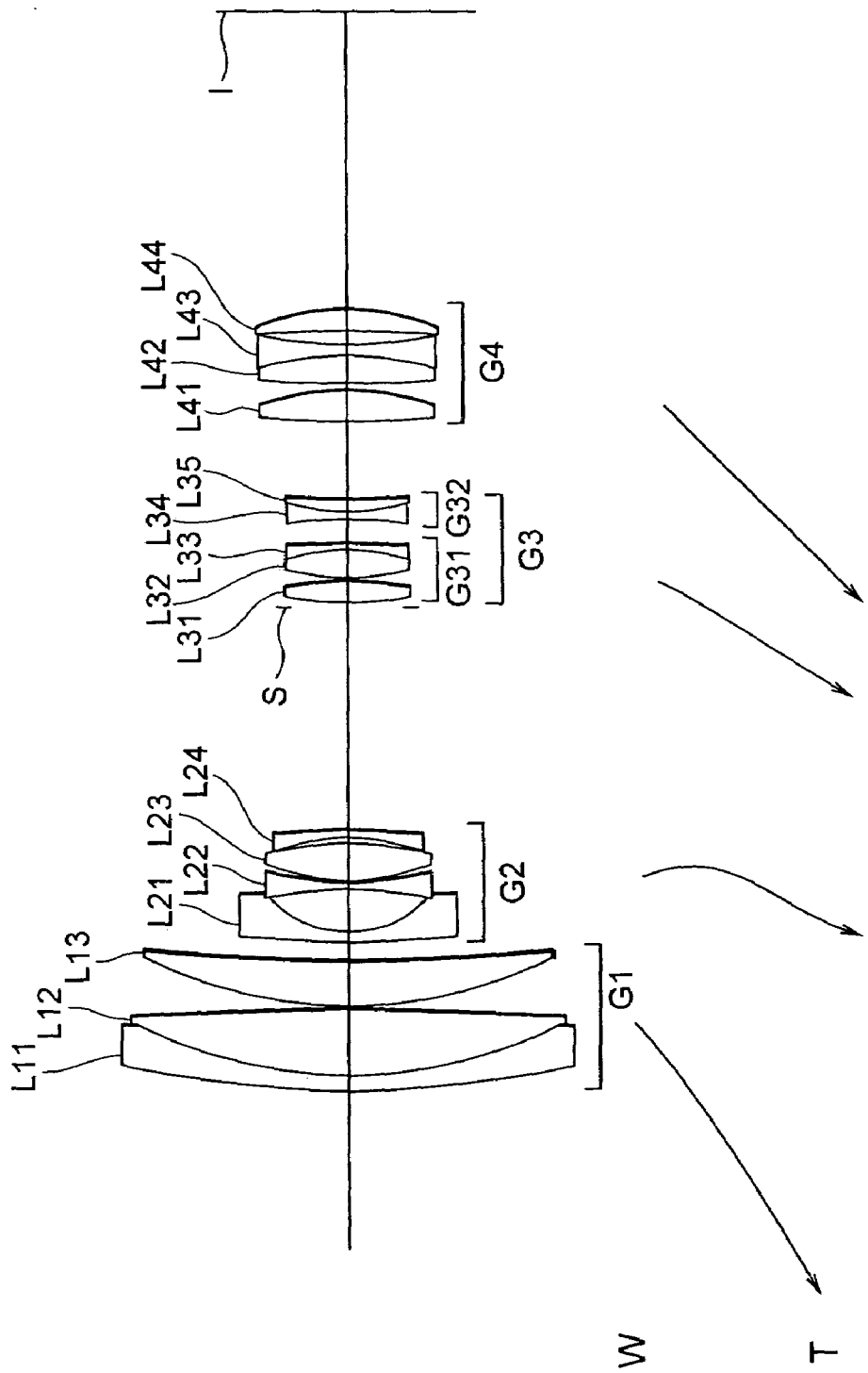
FIG. 5 is a diagram showing the lens configuration of a zoom lens system with a vibration reduction according to Example 2 of the present invention.

FIG. 5 is a diagram showing the lens configuration of a zoom lens system with a vibration reduction according to Example 2 of the present invention.

The zoom lens system with a vibration reduction according to Example 2 is composed of, in order from an object, a first lens group G1 having positive refractive power, a second lens group G2 having negative refractive power, an aperture stop S, a third lens group G3 having positive refractive power, and a fourth lens group G4 having positive refractive power.

In the zoom lens system with a vibration reduction according to Example 2, when a state of lens group positions varies from a wide-angle end state to a telephoto end state, the first lens group G1, the third lens group G3, and the fourth lens group G4 move to the object and the second lens group G2 moves such that a distance between the first lens group G1 and the second lens group G2 increases, a distance between the second lens group G2 and the third lens group G3 decreases, and a distance between the third lens group G3 and the fourth lens group G4 decreases.

The first lens group G1 is composed of, in order from the object, a cemented lens constructed by a negative meniscus lens L11 having a convex surface facing to the object cemented with a double convex positive lens L12, and a positive meniscus lens L13 having a convex surface facing to the object.

The second lens group G2 is composed of, in order from the object, a negative meniscus lens L21 having a convex surface facing to the object, a double concave negative lens L22, a double convex positive lens L23, a negative meniscus lens L24 having a concave surface facing to the object. The negative meniscus lens L21 disposed to the most object side of the second lens group G2 is an aspherical lens forming an aspherical surface by applying a resin layer on the object side lens surface thereof.

The third lens group G3 is composed of, in order from the object, a front lens group G31 having positive refractive power and a rear lens group G32 having negative refractive power. Vibration reduction, in other words, correction of an image blur is carried out by shifting only the rear lens group G32 in the direction perpendicular to the optical axis.

The front lens group G31 is composed of, in order from the object, a double convex positive lens L31, and a cemented lens constructed by a double convex positive lens L32 cemented with a plano-concave negative lens L33 having a concave surface facing to the object.

The rear lens group G32 is composed of a cemented lens constructed by, in order from the object, a double concave negative lens L34 cemented with a positive meniscus lens L35 having a convex surface facing to the object. The double concave negative lens L34 disposed to the most object side of the rear lens group G32 is an aspherical lens forming an aspherical surface by applying a resin layer on the object side lens surface thereof.

The fourth lens group G4 is composed of, in order from the object, a double convex positive lens L41, a cemented lens constructed by a double convex positive lens L42 cemented with a double concave negative lens L43, and a positive meniscus lens L44 having a concave surface facing to the object. The double convex positive lens L41 disposed to the most object side of the fourth lens group G4 is an aspherical lens forming an aspherical surface on the object side lens surface thereof.

The aperture stop S is disposed between the second lens group G2 and the third lens group G3 as described above and moved together with the front lens group G31 of the third lens group G3 upon zooming from the wide-angle end state to the telephoto end state.

Focusing from infinity to a close object is carried out by moving the second lens group G2 to the object.

As described above, vibration reduction is carried out by shifting only the rear lens group G32 in the direction perpendicular to the optical axis. In the zoom lens system with a vibration reduction according to Example 2, since the vibration reduction coefficient K is 1.134 and the focal length f is 18.50 (mm) in the wide-angle end state, in order to correct rotational image blur of 0.60 degrees, the shift amount of the rear lens group G32 becomes 0.171 (mm). In the telephoto end state, since the vibration reduction coefficient K is 2.009 and the focal length f is 195.00 (mm), in order to correct rotational image blur of 0.20 degrees, the shift amount of the rear lens group G32 becomes 0.339 (mm).

Various values associated with a zoom lens system with a vibration reduction according to Example 2 are shown in Table 2.

TABLE 2

[Specifications]

| | W | M | T |
|---|---|---|---|
| f = | 18.50 | 70.58 | 195.00 |
| FNO = | 3.57 | 5.09 | 5.81 |
| 2ω = | 77.44° | 21.91° | 8.10° |

[Lens Data]

| | r | d | ν | n |
|---|---|---|---|---|
| 1 | 134.2298 | 2.0000 | 32.35 | 1.850260 |
| 2 | 64.0930 | 8.8000 | 81.61 | 1.497000 |
| 3 | −455.1922 | 0.1000 | | |
| 4 | 59.0442 | 6.3000 | 65.47 | 1.603000 |
| 5 | 278.8837 | (d5) | | |
| 6* | 169.6714 | 0.1500 | 38.09 | 1.553890 |
| 7 | 116.5468 | 1.2000 | 46.63 | 1.816000 |
| 8 | 14.1945 | 5.6000 | | |
| 9 | −50.0283 | 1.0000 | 46.63 | 1.816000 |
| 10 | 39.1951 | 0.1000 | | |
| 11 | 27.2138 | 4.8000 | 23.78 | 1.846660 |
| 12 | −47.2390 | 0.9000 | | |
| 13 | −26.4293 | 1.0000 | 47.38 | 1.788000 |
| 14 | −144.6464 | (d14) | | |
| 15 | ∞ | 0.5000 | Aperture Stop S | |
| 16 | 40.5909 | 3.0000 | 65.47 | 1.603000 |
| 17 | −40.5909 | 0.1000 | | |
| 18 | 26.4211 | 3.6000 | 81.61 | 1.497000 |
| 19 | −31.3570 | 1.0000 | 32.35 | 1.850260 |
| 20 | ∞ | 3.0000 | | |
| 21* | −48.0486 | 0.1000 | 38.09 | 1.553890 |
| 22 | −50.9404 | 1.0000 | 49.61 | 1.772500 |
| 23 | 29.8100 | 1.8000 | 25.43 | 1.805180 |
| 24 | 78.3305 | (d24) | | |
| 25* | 80.0866 | 4.4000 | 54.52 | 1.676974 |
| 26 | −32.2199 | 0.6000 | | |
| 27 | 119.1591 | 4.0000 | 70.24 | 1.487490 |
| 28 | −32.0950 | 1.4000 | 37.17 | 1.834000 |
| 29 | 60.5341 | 1.5000 | | |
| 30 | −119.5799 | 3.3000 | 64.12 | 1.516800 |
| 31 | −28.0454 | (Bf) | | |

[Aspherical Data]

Surface Number 6

κ = 1.0000
b = 1.00790E−05
c = −4.17580E−08
d = 1.36860E−10
e = −2.18740E−13

Surface Number 21
Effective Diameter = 15.0 mm

κ = 1.0000
b = 9.66620E−06
c = 3.29250E−09
d = 0.00000E+00
e = 0.00000E+00

TABLE 2-continued

Surface Number 25

κ = 1.0000
b = −1.94720E−05
c = 2.75020E−09
d = 0.00000E+00
e = 0.00000E+00

| | W | M | T |
|---|---|---|---|
| [Variable Distances] | | | |
| f | 18.50109 | 70.58244 | 194.99580 |
| d5 | 2.07000 | 38.00000 | 60.00000 |
| d14 | 29.40000 | 11.00000 | 1.80000 |
| d24 | 10.10000 | 4.60000 | 3.00000 |
| Bf | 38.04456 | 67.30022 | 79.17192 |
| [Moving Amount upon Focusing] | | | |
| f | 18.50 | 70.58 | 195.00 |
| δ1 | 0.855 | 2.944 | 9.422 |

[Values for Conditional Expressions]

| (1): f1/fw = | 5.408 |
|---|---|
| (2): Bfw/fw = | 2.056 |
| (3): f3/fw = | 2.660 |
| (4): f3R/f3F = | −1.501 |
| (5): f3/f4 = | 1.143 |
| (6): fw/Re = | −0.660 |
| (7): M2t = | −0.837 |
| (8): f1/fw = | 5.408 |
| (9): f3/fw = | 2.660 |
| (10), (11): 0.0001 × (h/2) = | 0.0008 |
| \|X50\| = | 0.0019 |
| \|Xm\| = | 0.0312 |
| 0.01 × (h/2) = | 0.075 |
| (12): \|X50\|/\|Xm\| = | 0.061 |
| (13): f3/f4 = | 1.143 |
| (14): Bfw/fw = | 2.056 |
| (15): Ds/f3 = | 0.228 |

Figure 6A:
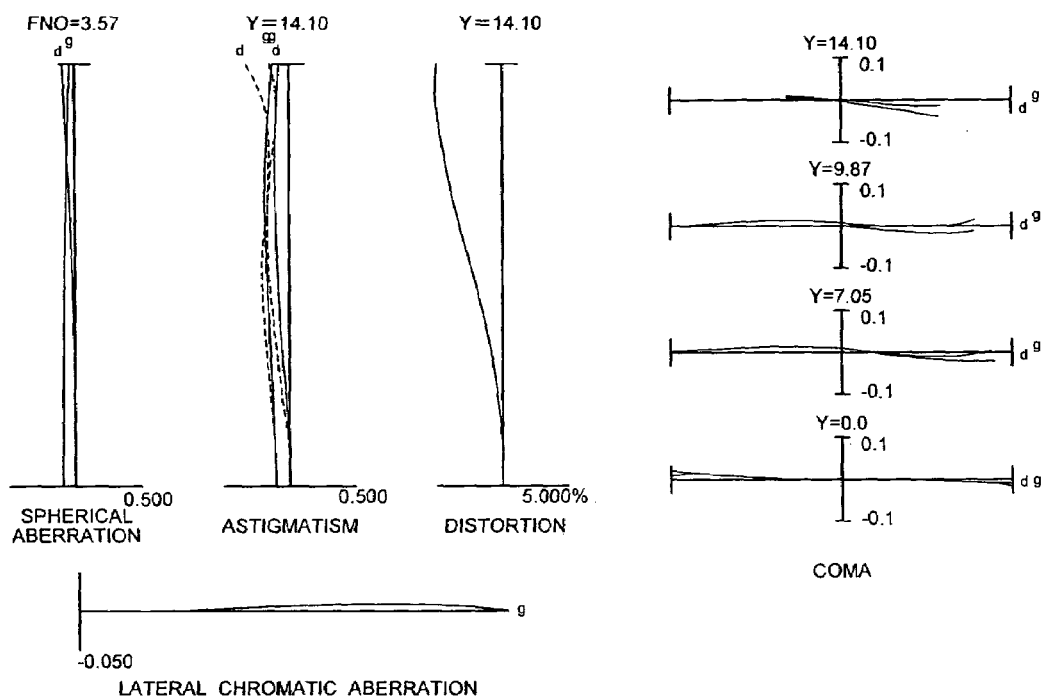
FIGS. 6A and 6B are graphs showing various aberrations of the zoom lens system with a vibration reduction according to Example 2 of the present invention in the wide-angle end state upon focusing on infinity and lateral aberrations in meridional image plane upon correcting rotational image blur of 0.60 degrees, respectively.
Figure 6B:
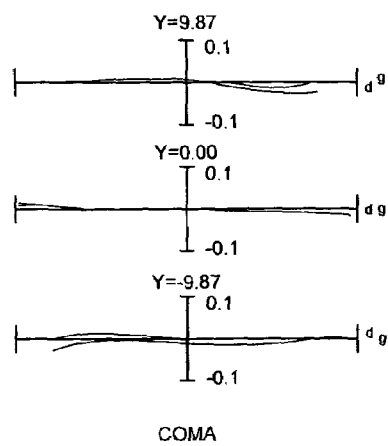

FIGS. 6A and 6B are graphs showing various aberrations of the zoom lens system with a vibration reduction according to Example 2 of the present invention in the wide-angle end state upon focusing on infinity and lateral aberrations in meridional image plane upon correcting rotational image blur of 0.60 degrees, respectively.

Figure 7:
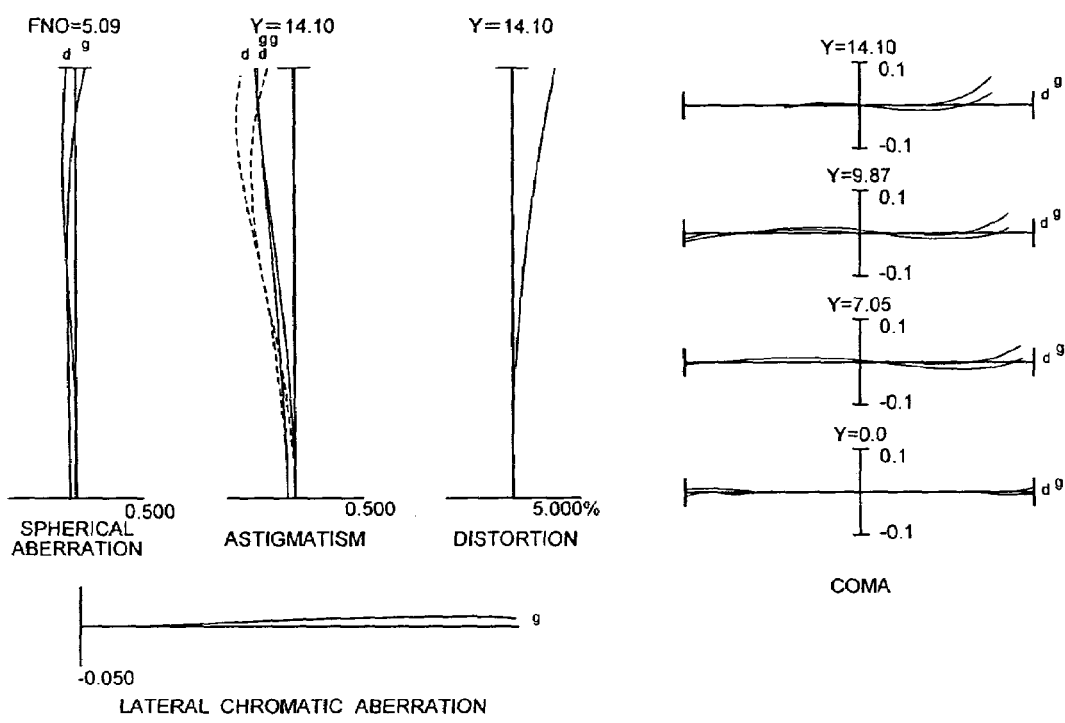
FIG. 7 is graphs showing various aberrations of the zoom lens system with a vibration reduction according to Example 2 of the present invention in the intermediate focal length state upon focusing on infinity.
Figure 8A:
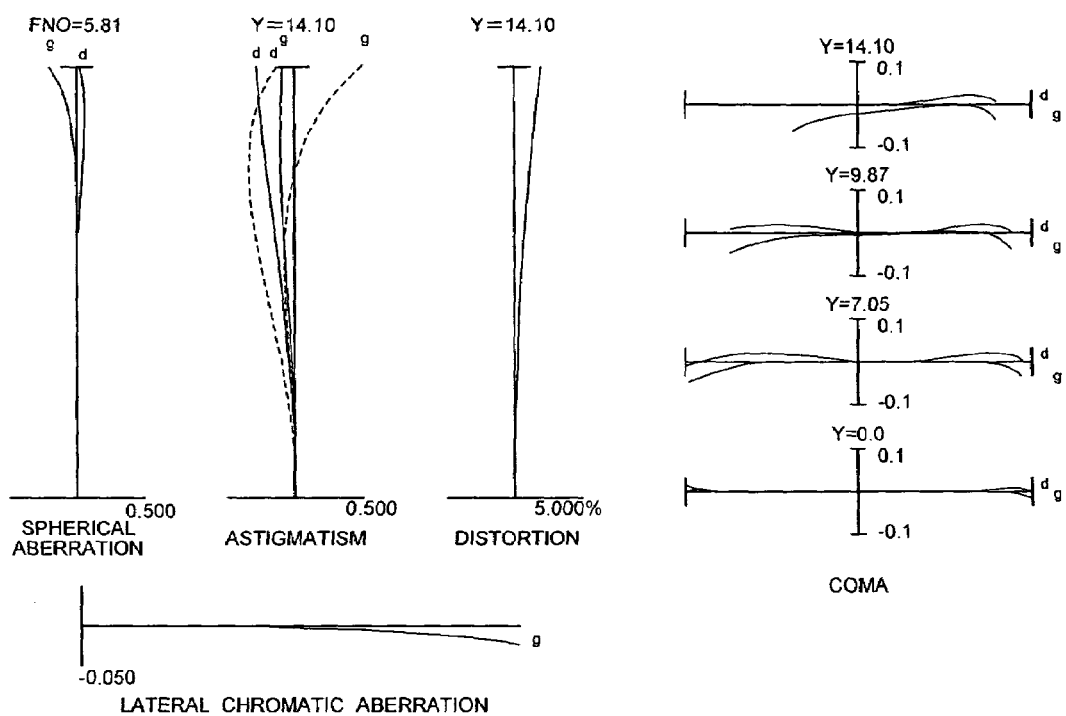
FIGS. 8A and 8B are graphs showing various aberrations of the zoom lens system with a vibration reduction according to Example 2 of the present invention in the telephoto end state upon focusing on infinity and lateral aberrations in meridional image plane upon correcting rotational image blur of 0.20 degrees, respectively.
Figure 8B:
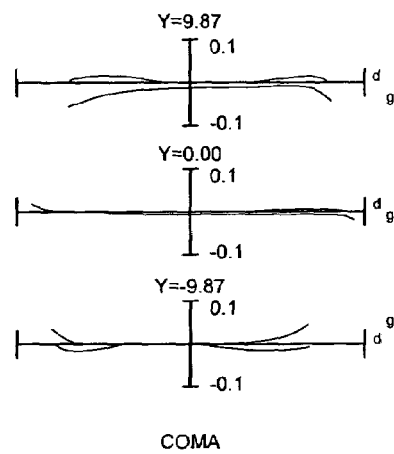

FIG. 7 is graphs showing various aberrations of the zoom lens system with a vibration reduction according to Example 2 of the present invention in the intermediate focal length state upon focusing on infinity FIGS. 8A and 8B are graphs showing various aberrations of the zoom lens system with a vibration reduction according to Example 2 of the present invention in the telephoto end state upon focusing on infinity and lateral aberrations in meridional image plane upon correcting rotational image blur of 0.20 degrees, respectively.

As is apparent from the respective graphs, the zoom lens system with a vibration reduction according to Example 2 shows superb optical performance as a result of good corrections to various aberrations in each focal length state from the wide-angle end state to the telephoto end state.

EXAMPLE 3

Figure 9:
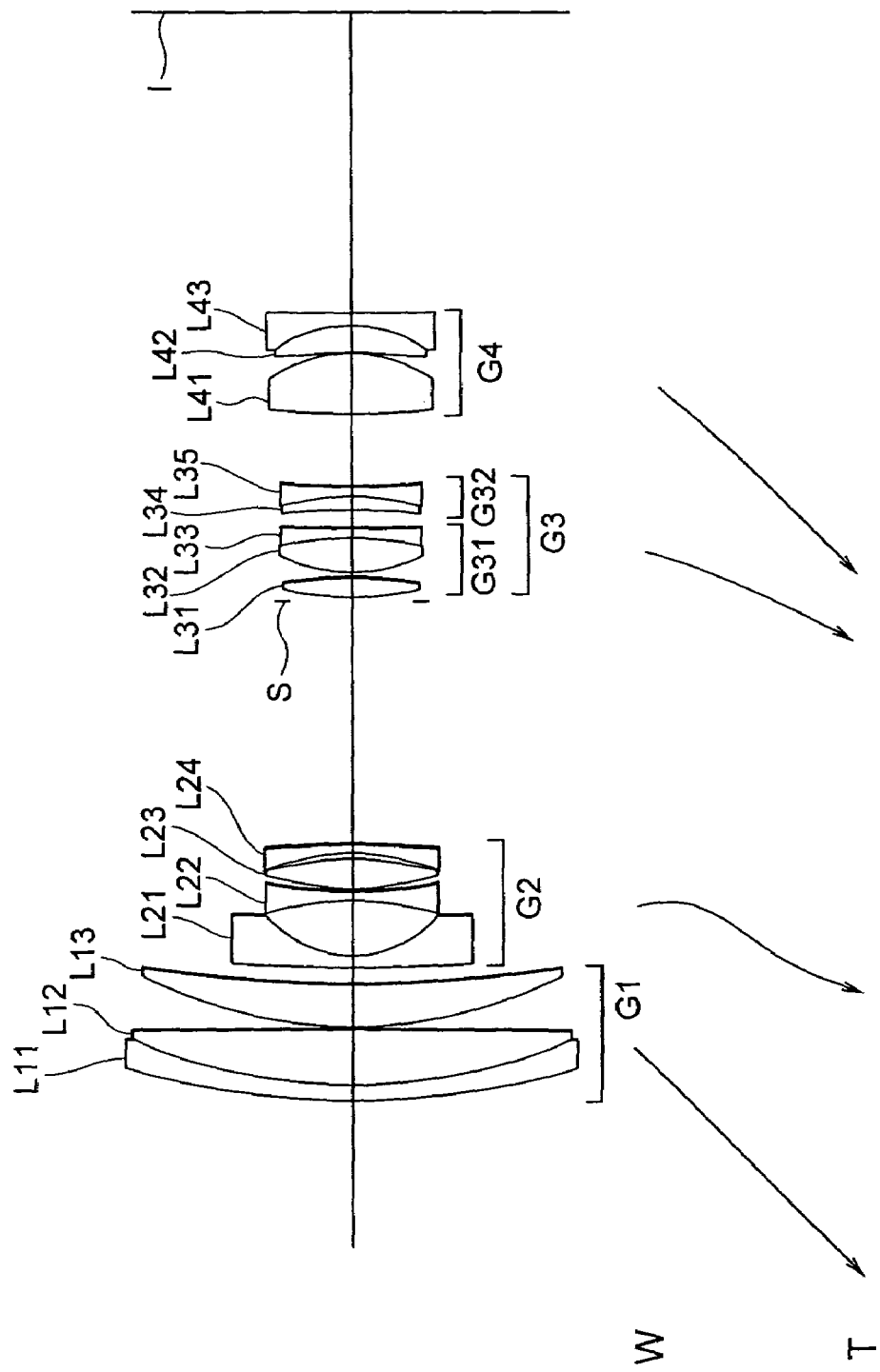
FIG. 9 is a diagram showing the lens configuration of a zoom lens system with a vibration reduction according to Example 3 of the present invention.

FIG. 9 is a diagram showing the lens configuration of a zoom lens system with a vibration reduction according to Example 3 of the present invention.

The zoom lens system with a vibration reduction according to Example 3 is composed of, in order from an object, a first lens group G1 having positive refractive power, a second lens group G2 having negative refractive power, an aperture stop S, a third lens group G3 having positive refractive power, and a fourth lens group G4 having positive refractive power.

In the zoom lens system with a vibration reduction according to Example 3, when a state of lens group positions varies from a wide-angle end state to a telephoto end state, the first lens group G1, the third lens group G3, and the fourth lens group G4 move to the object and the second lens group G2 moves such that a distance between the first lens group G1 and the second lens group G2 increases, a distance between the second lens group G2 and the third lens group G3 decreases, and a distance between the third lens group G3 and the fourth lens group G4 decreases.

The first lens group G1 is composed of, in order from the object, a cemented lens constructed by a negative meniscus lens L11 having a convex surface facing to the object cemented with a double convex positive lens L12, and a positive meniscus lens L13 having a convex surface facing to the object.

The second lens group G2 is composed of, in order from the object, a negative meniscus lens L21 having a convex surface facing to the object, a double concave negative lens L22, a double convex positive lens L23, a negative meniscus lens L24 having a concave surface facing to the object. The negative meniscus lens L21 disposed to the most object side of the second lens group G2 is an aspherical lens forming an aspherical surface by applying a resin layer on the object side lens surface thereof.

The third lens group G3 is composed of, in order from the object, a front lens group G31 having positive refractive power and a rear lens group G32 having negative refractive power. Vibration reduction, in other words, correction of an image blur is carried out by shifting only the rear lens group G32 in the direction perpendicular to the optical axis.

The front lens group G31 is composed of, in order from the object, a double convex positive lens L31, and a cemented lens constructed by a double convex positive lens L32 cemented with a double concave negative lens L33.

The rear lens group G32 is composed of a cemented lens constructed by, in order from the object, a positive meniscus lens L34 having a concave surface facing to the object cemented with a double concave negative lens L35. The positive meniscus lens L34 disposed to the most object side of the rear lens group G32 is an aspherical lens forming an aspherical surface by applying a resin layer on the object side lens surface thereof.

The fourth lens group G4 is composed of, in order from the object, a double convex positive lens L41, a cemented lens constructed by a positive meniscus lens L42 having a concave surface facing to the object cemented with a double concave negative lens L43. The double convex positive lens L41 disposed to the most object side of the fourth lens group G4 is an aspherical lens forming aspherical surfaces on both lens surfaces thereof.

The aperture stop S is disposed between the second lens group G2 and the third lens group G3 as described above and moved together with the front lens group G31 of the third lens group G3 upon zooming from the wide-angle end state to the telephoto end state.

Focusing from infinity to a close object is carried out by moving the second lens group G2 to the object.

As described above, vibration reduction is carried out by shifting only the rear lens group G32 in the direction perpendicular to the optical axis.

In the zoom lens system with a vibration reduction according to Example 3, since the vibration reduction coefficient K is 0.889 and the focal length f is 18.30 (mm) in the wide-angle end state, in order to correct rotational image blur of 0.60 degrees, the shift amount of the rear lens group G32 becomes 0.216 (mm). In the telephoto end state, since the vibration reduction coefficient K is 1.747 and the focal length f is 196.00 (mm), in order to correct rotational image blur of 0.20 degrees, the shift amount of the rear lens group G32 becomes 0.392 (mm).

Various values associated with a zoom lens system with a vibration reduction according to Example 3 are shown in Table 3.

TABLE 3

[Specifications]

| | W | M | T |
|---|---|---|---|
| f = | 18.30 | 72.00 | 196.00 |
| FNO = | 3.32 | 5.33 | 5.95 |
| 2ω = | 78.14° | 21.85° | 8.13° |

[Lens Data]

| | r | d | ν | n |
|---|---|---|---|---|
| 1 | 105.9610 | 2.0000 | 23.78 | 1.846660 |
| 2 | 71.3260 | 7.5407 | 81.54 | 1.496999 |
| 3 | −1309.8498 | 0.2000 | | |
| 4 | 62.7400 | 5.6340 | 65.44 | 1.603001 |
| 5 | 172.3159 | (d5) | | |
| 6* | 3247.3313 | 0.2000 | 38.09 | 1.553890 |
| 7 | 350.0000 | 1.4000 | 46.62 | 1.816000 |
| 8 | 15.5519 | 7.2691 | | |
| 9 | −38.1063 | 1.4000 | 46.62 | 1.816000 |
| 10 | 58.2259 | 0.2096 | | |
| 11 | 39.9359 | 4.0201 | 23.78 | 1.846660 |
| 12 | −38.0549 | 0.6961 | | |
| 13 | −28.7047 | 1.4000 | 46.62 | 1.816000 |
| 14 | −92.9967 | (d14) | | |
| 15 | ∞ | 0.5000 | Aperture Stop S | |
| 16 | 41.2957 | 2.7565 | 70.23 | 1.487490 |
| 17 | −49.3120 | 0.4901 | | |
| 18 | 20.9493 | 4.6210 | 81.54 | 1.496999 |
| 19 | −41.7503 | 1.4000 | 32.35 | 1.850260 |
| 20 | 170.2856 | 2.2624 | | |
| 21* | −68.7491 | 1.8465 | 23.78 | 1.846660 |
| 22 | −31.9511 | 1.4000 | 46.62 | 1.816000 |
| 23 | 107.0149 | (d23) | | |
| 24* | 54.7472 | 7.6656 | 59.46 | 1.583129 |
| 25* | −19.8886 | 0.2000 | | |
| 26 | −80.6973 | 3.5979 | 60.08 | 1.639999 |
| 27 | −16.9513 | 1.6279 | 40.92 | 1.806098 |
| 28 | 447.1115 | (Bf) | | |

[Aspherical Data]

Surface Number 6

κ = 914152
b = 1.46890E−05
c = −5.00490E−08
d = 2.39330E−10
e = −5.14510E−13

Surface Number 21
Effective Diameter = 17.88 mm

κ = −5.4970
b = 2.63620E−06
c = −3.02920E−08
d = 4.35670E−10
e = −1.87450E−12

Surface Number 24

κ = 10.2988
b = −3.86840E−05
c = −2.10020E−08
d = −6.08770E−10
e = −1.90870E−12

TABLE 3-continued

Surface Number 25

κ = −0.5656
b = −1.50360E−05
c = −3.40270E−08
d = −2.15350E−10
e = −1.74120E−12

| | W | M | T |
|---|---|---|---|
| [Variable Distances] | | | |
| f | 18.30014 | 72.00011 | 196.00082 |
| d5 | 2.00001 | 32.05608 | 59.13620 |
| d14 | 31.55579 | 9.21847 | 1.00000 |
| d23 | 9.40857 | 4.33178 | 3.16583 |
| Bf | 39.00002 | 78.75226 | 89.56258 |
| [Moving Amount upon Focusing] | | | |
| f | 18.30 | 72.00 | 196.00 |
| δ1 | 1.063 | 2.558 | 9.820 |

[Values for Conditional Expressions]

| | |
|---|---|
| (1): f1/fw = | 5.682 |
| (2): Bfw/fw = | 2.131 |
| (3): f3/fw = | 2.744 |
| (4): f3R/f3F = | −1.746 |
| (5): f3/f4 = | 1.050 |
| (6): fw/Re = | 0.041 |
| (7): M2t = | −0.743 |
| (8): f1/fw = | 5.682 |
| (9): f3/fw = | 2.744 |
| (10), (11): 0.0001 × (h/2) = | 0.0009 |
| \|X50\| = | 0.0019 |
| \|Xm\| = | 0.0284 |
| 0.01 × (h/2) = | 0.089 |
| (12): \|X50\|/\|Xm\| = | 0.067 |
| (13): f3/f4 = | 1.050 |
| (14): Bfw/fw = | 2.131 |
| (15): Ds/f3 = | 0.240 |

Figure 10A:
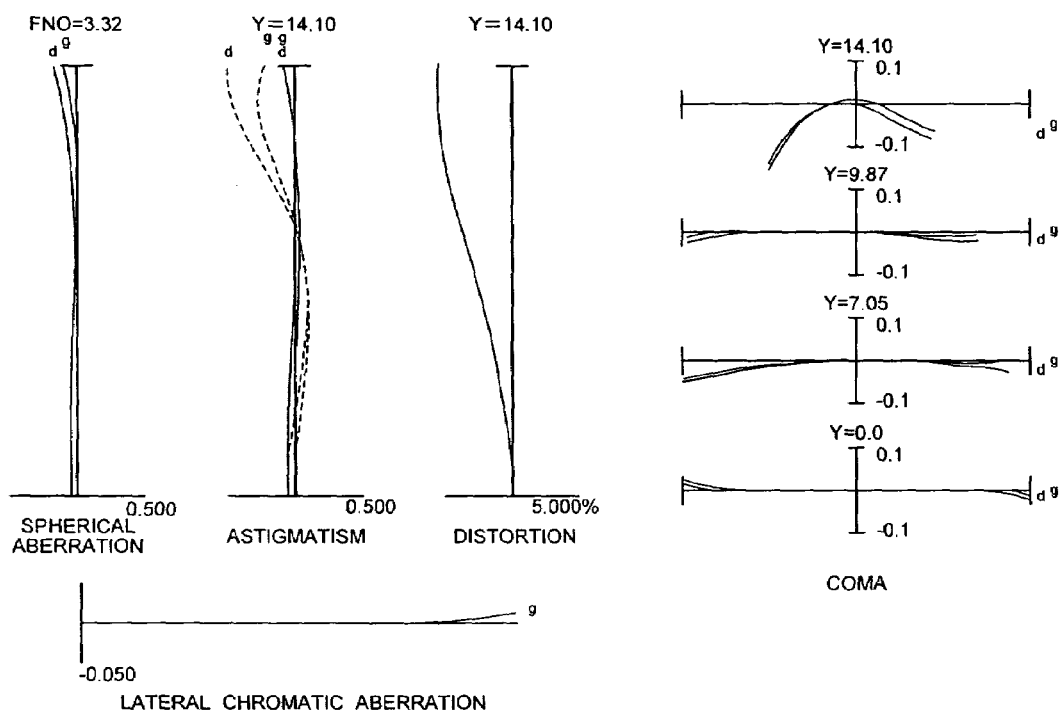
FIGS. 10A and 10B are graphs showing various aberrations of the zoom lens system with a vibration reduction according to Example 3 of the present invention in the wide-angle end state upon focusing on infinity and lateral aberrations in meridional image plane upon correcting rotational image blur of 0.60 degrees, respectively.
Figure 10B:
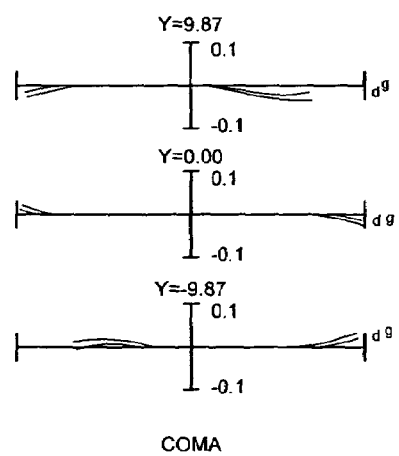

FIGS. 10A and 10B are graphs showing various aberrations of the zoom lens system with a vibration reduction according to Example 3 of the present invention in the wide-angle end state upon focusing on infinity and lateral aberrations in meridional image plane upon correcting rotational image blur of 0.60 degrees, respectively.

Figure 11:
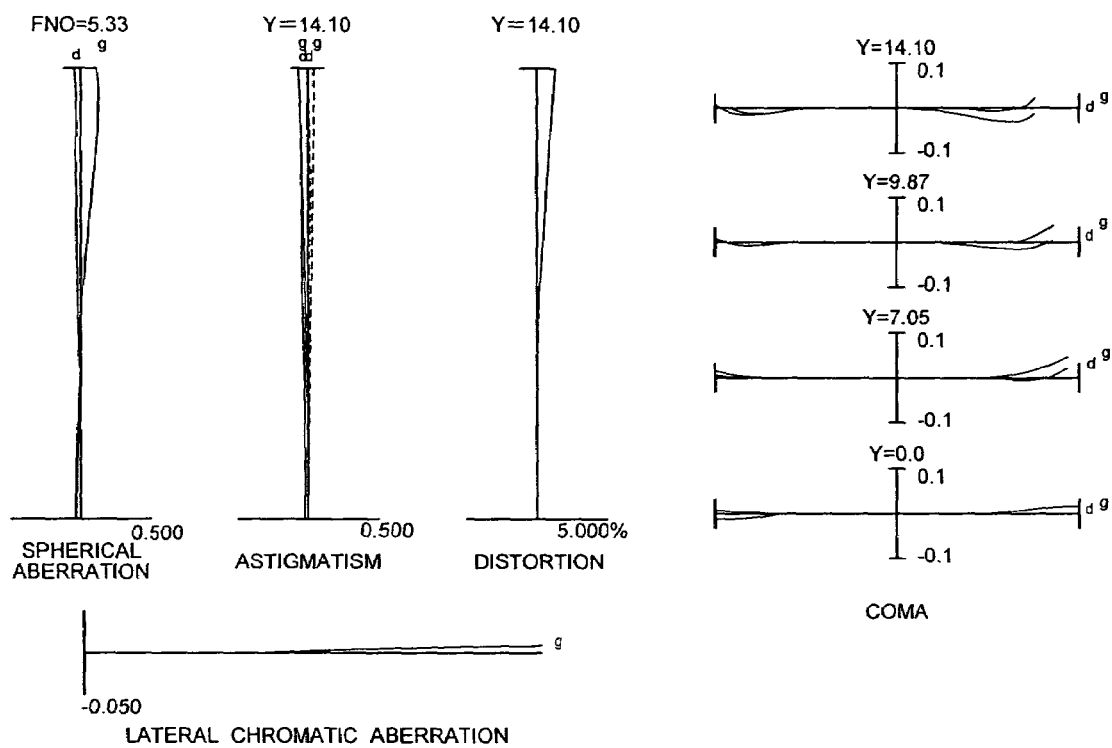
FIG. 11 is graphs showing various aberrations of the zoom lens system with a vibration reduction according to Example 3 of the present invention in the intermediate focal length state upon focusing on infinity.

FIG. 11 is graphs showing various aberrations of the zoom lens system with a vibration reduction according to Example 3 of the present invention in the intermediate focal length state upon focusing on infinity.

Figure 12A:
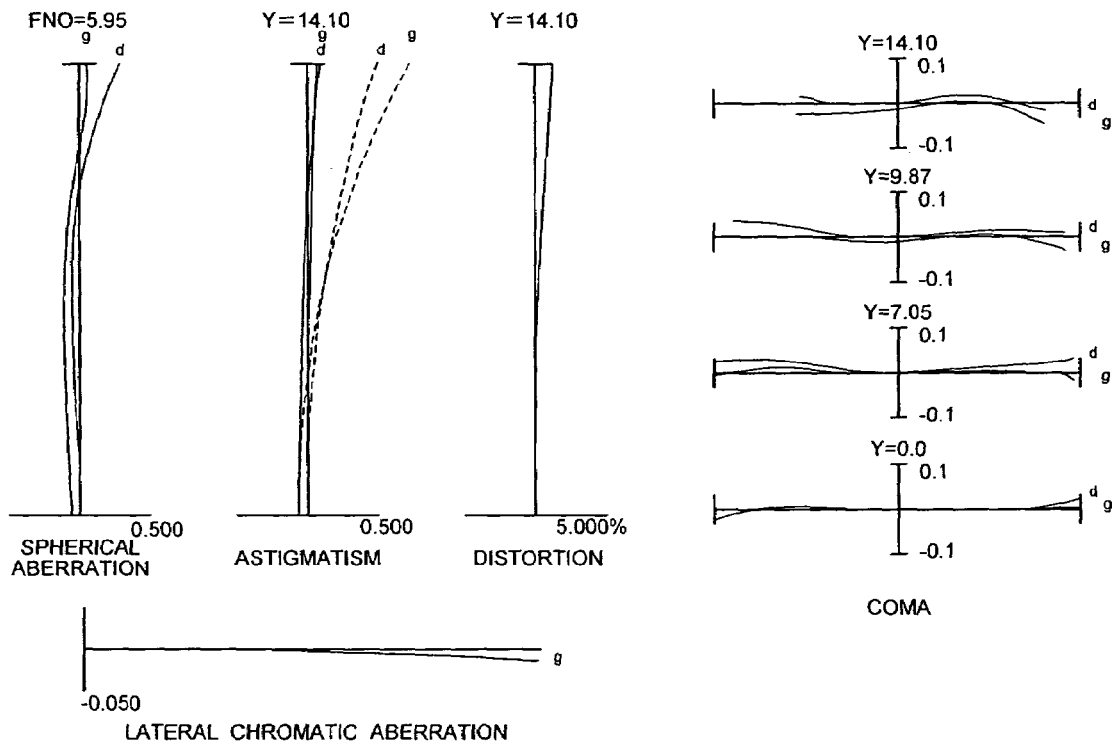
FIGS. 12A and 12B are graphs showing various aberrations of the zoom lens system with a vibration reduction according to Example 3 of the present invention in the telephoto end state upon focusing on infinity and lateral aberrations in meridional image plane upon correcting rotational image blur of 0.20 degrees, respectively.
Figure 12B:
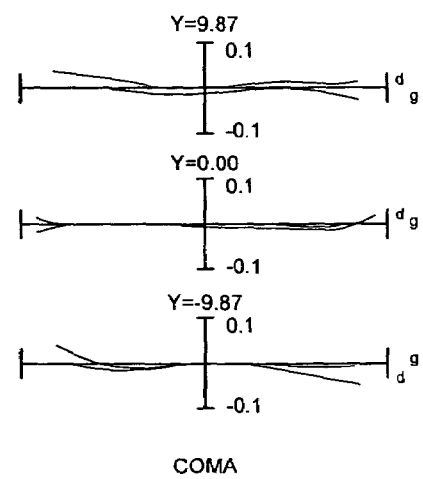

FIGS. 12A and 12B are graphs showing various aberrations of the zoom lens system with a vibration reduction according to Example 3 of the present invention in the telephoto end state upon focusing on infinity and lateral aberrations in meridional image plane upon correcting rotational image blur of 0.20 degrees, respectively.

As is apparent from the respective graphs, the zoom lens system with a vibration reduction according to Example 3 shows superb optical performance as a result of good corrections to various aberrations in each focal length state from the wide-angle end state to the telephoto end state.

EXAMPLE 4

Figure 13:
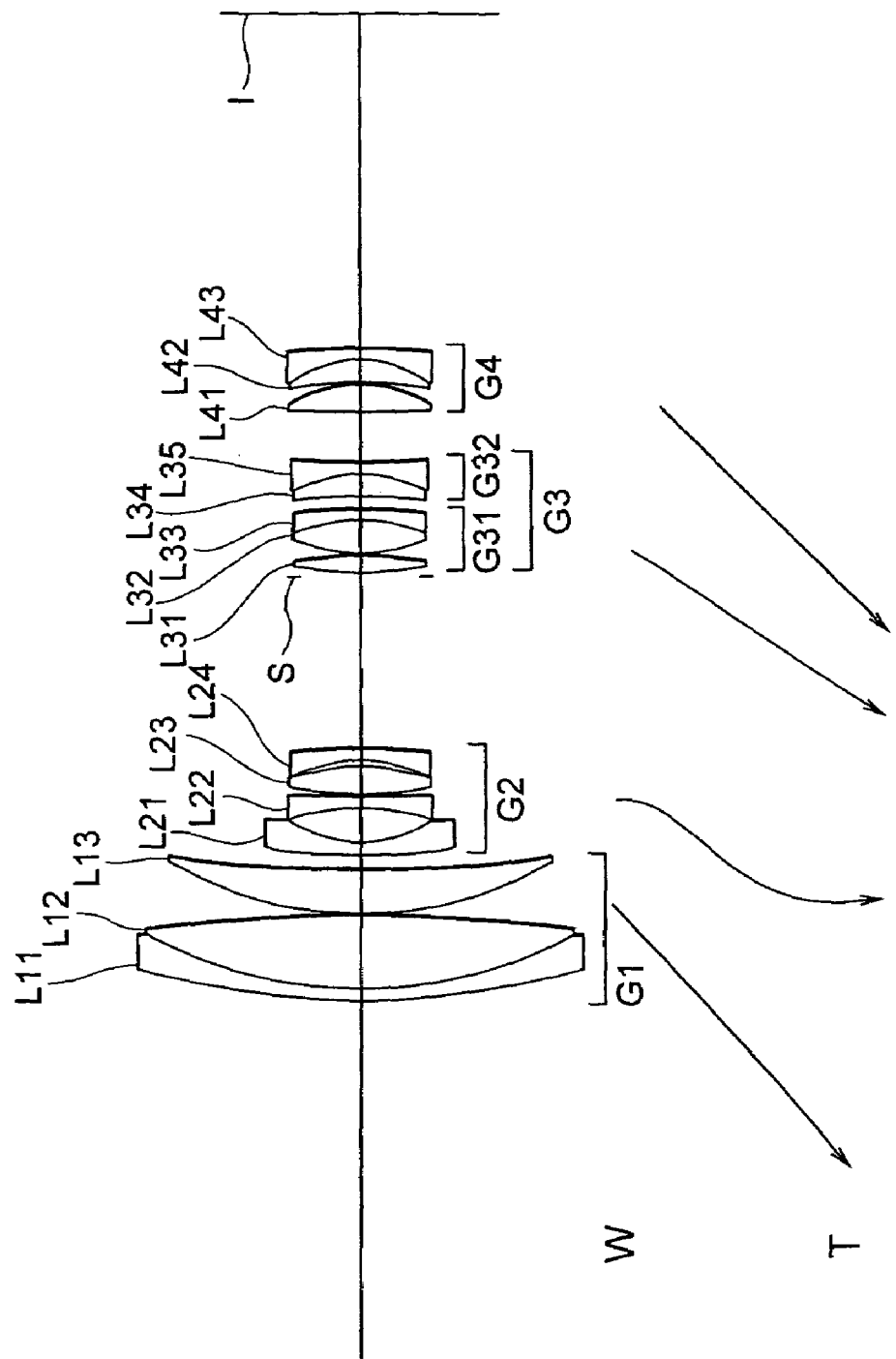
FIG. 13 is a diagram showing the lens configuration of a zoom lens system with a vibration reduction according to Example 4 of the present invention.

FIG. 13 is a diagram showing the lens configuration of a zoom lens system with a vibration reduction according to Example 4 of the present invention.

The zoom lens system with a vibration reduction according to Example 4 is composed of, in order from an object, a first lens group G1 having positive refractive power, a second lens group G2 having negative refractive power, an aperture stop S, a third lens group G3 having positive refractive power, and a fourth lens group G4 having positive refractive power.

In the zoom lens system with a vibration reduction according to Example 4, when a state of lens group positions varies from a wide-angle end state to a telephoto end state, the first lens group G1, the third lens group G3, and the fourth lens group G4 move to the object and the second lens group G2 moves such that a distance between the first lens group G1 and the second lens group G2 increases, a distance between the second lens group G2 and the third lens group G3 decreases, and a distance between the third lens group G3 and the fourth lens group G4 decreases.

The first lens group G1 is composed of, in order from the object, a cemented lens constructed by a negative meniscus lens L11 having a convex surface facing to the object cemented with a double convex positive lens L12, and a positive meniscus lens L13 having a convex surface facing to the object.

The second lens group G2 is composed of, in order from the object, a negative meniscus lens L21 having a convex surface facing to the object, a double concave negative lens L22, a double convex positive lens L23, a negative meniscus lens L24 having a concave surface facing to the object. The negative meniscus lens L21 disposed to the most object side of the second lens group G2 is an aspherical lens forming an aspherical surface by applying a resin layer on the object side lens surface thereof.

The third lens group G3 is composed of, in order from the object, a front lens group G31 having positive refractive power and a rear lens group G32 having negative refractive power. Vibration reduction, in other words, correction of an image blur is carried out by shifting only the rear lens group G32 in the direction perpendicular to the optical axis.

The front lens group G31 is composed of, in order from the object, a double convex positive lens L31, and a cemented lens constructed by a double convex positive lens L32 cemented with a negative meniscus lens L33 having a concave surface facing to the object.

The rear lens group G32 is composed of a cemented lens constructed by, in order from the object, a positive meniscus lens L34 having a concave surface facing to the object cemented with a double concave negative lens L35. The positive meniscus lens L34 disposed to the most object side of the rear lens group G32 is an aspherical lens forming an aspherical surface by applying a resin layer on the object side lens surface thereof.

The fourth lens group G4 is composed of, in order from the object, a double convex positive lens L41, a cemented lens constructed by a positive meniscus lens L42 having a concave surface facing to the object cemented with a negative meniscus lens L43 having a concave surface facing to the object. The double convex positive lens L41 disposed to the most object side of the fourth lens group G4 is an aspherical lens forming aspherical surfaces on both lens surfaces thereof.

The aperture stop S is disposed between the second lens group G2 and the third lens group G3 as described above and moved together with the front lens group G31 of the third lens group G3 upon zooming from the wide-angle end state to the telephoto end state.

Focusing from infinity to a close object is carried out by moving the second lens group G2 to the object.

As described above, vibration reduction is carried out by shifting only the rear lens group G32 in the direction perpendicular to the optical axis. In the zoom lens system with a vibration reduction according to Example 4, since the vibration reduction coefficient K is 1.147 and the focal length f is 20.63 (mm) in the wide-angle end state, in order to correct rotational image blur of 0.60 degrees, the shift amount of the rear lens group G32 becomes 0.188 (mm). In the telephoto end state, since the vibration reduction coefficient K is 1.976 and the focal length f is 196.46 (mm), in order to correct rotational image blur of 0.20 degrees, the shift amount of the rear lens group G32 becomes 0.347 (mm).

Various values associated with a zoom lens system with a vibration reduction according to Example 4 are shown in Table 4.

TABLE 4

[Specifications]

| | W | M | T |
|---|---|---|---|
| f = | 20.63 | 72.05 | 196.46 |
| FNO = | 3.56 | 5.27 | 5.70 |
| 2ω = | 71.47° | 21.56° | 8.02° |

[Lens Data]

| | r | d | ν | n |
|---|---|---|---|---|
| 1 | 93.1885 | 1.5000 | 32.35 | 1.850260 |
| 2 | 54.0487 | 8.8553 | 82.52 | 1.497820 |
| 3 | −263.5006 | 0.2000 | | |
| 4 | 45.9278 | 5.3255 | 82.52 | 1.497820 |
| 5 | 164.8751 | (d5) | | |
| 6* | 69.8459 | 0.1380 | 38.09 | 1.553890 |
| 7 | 74.3360 | 1.4000 | 46.63 | 1.816000 |
| 8 | 13.3861 | 4.4109 | | |
| 9 | −25.9378 | 1.4000 | 46.63 | 1.816000 |
| 10 | 75.9758 | 0.2000 | | |
| 11 | 33.1079 | 3.4027 | 23.78 | 1.846659 |
| 12 | −26.3636 | 0.8226 | | |
| 13 | −17.4698 | 1.4000 | 46.63 | 1.816000 |
| 14 | −151.0383 | (d14) | | |
| 15 | ∞ | 0.2000 | Aperture Stop S | |
| 16 | 41.1222 | 2.0987 | 60.08 | 1.639999 |
| 17 | −70.8824 | 0.2000 | | |
| 18 | 19.6574 | 3.8836 | 82.52 | 1.497820 |
| 19 | −25.0076 | 1.4000 | 25.42 | 1.805181 |
| 20 | −120.5054 | 1.5000 | | |
| 21* | −100.4883 | 2.8127 | 28.46 | 1.728250 |
| 22 | −16.5477 | 1.4000 | 46.62 | 1.816000 |
| 23 | 61.8649 | (d23) | | |
| 24* | 70.4569 | 3.2409 | 54.52 | 1.676974 |
| 25* | −18.8411 | 0.2000 | | |
| 26 | −52.6818 | 2.7746 | 47.22 | 1.540720 |
| 27 | −14.4027 | 1.4000 | 34.97 | 1.800999 |
| 28 | −132.0069 | (Bf) | | |

[Aspherical Data]

Surface Number 6

κ = 1.0000
b = 1.21650E−05
c = 5.07790E−08
d = −8.31590E−10
e = 6.35490E−12

Surface Number 21
Effective Diameter = 15.6 mm

κ = −0.5201
b = 1.10140E−05
c = 3.88890E−08
d = −3.77380E−10
e = 2.20940E−12

Surface Number 24

κ = −14.2400
b = −2.66160E−05

TABLE 4-continued c = −1.00060E−07
d = −3.80740E−10
e = 6.55080E−13
Surface Number 25

κ = 0.3071
b = −6.09280E−06
c = −6.17870E−08
d = −8.42130E−10
e = 2.52800E−12

|  | W | M | T |
|---|---|---|---|
| [Variable Distances] | | | |
| f | 20.62988 | 72.05031 | 196.46091 |
| d5 | 1.40201 | 27.41287 | 46.50963 |
| d14 | 21.02277 | 8.78717 | 0.99999 |
| d23 | 6.18019 | 3.84692 | 3.23042 |
| Bf | 40.03100 | 68.41700 | 75.26872 |
| [Moving Amount upon Focusing] | | | |
| f | 20.63 | 72.05 | 196.46 |
| δ1 | 0.588 | 1.793 | 7.621 |
| [Values for Conditional Expressions] | | | |
| (1): f1/fw = | | | 3.9437 |
| (2): Bfw/fw = | | | 1.940 |
| (3): f3/fw = | | | 1.841 |
| (4): f3R/f3F = | | | −1.693 |
| (5): f3/f4 = | | | 0.907 |
| (6): fw/Re = | | | −0.156 |
| (7): M2t = | | | −0.925 |
| (8): f1/fw = | | | 3.944 |
| (9): f3/fw = | | | 1.841 |
| (10), (11): 0.0001 × (h/2) = | | | 0.0008 |
| |X50| = | | | 0.0027 |
| |Xm| = | | | 0.0469 |
| 0.01 × (h/2) = | | | 0.078 |
| (12): |X50|/|Xm| = | | | 0.058 |
| (13): f3/f4 = | | | 0.907 |
| (14): Bfw/fw = | | | 1.940 |
| (15): Ds/f3 = | | | 0.244 |

Figure 14A:
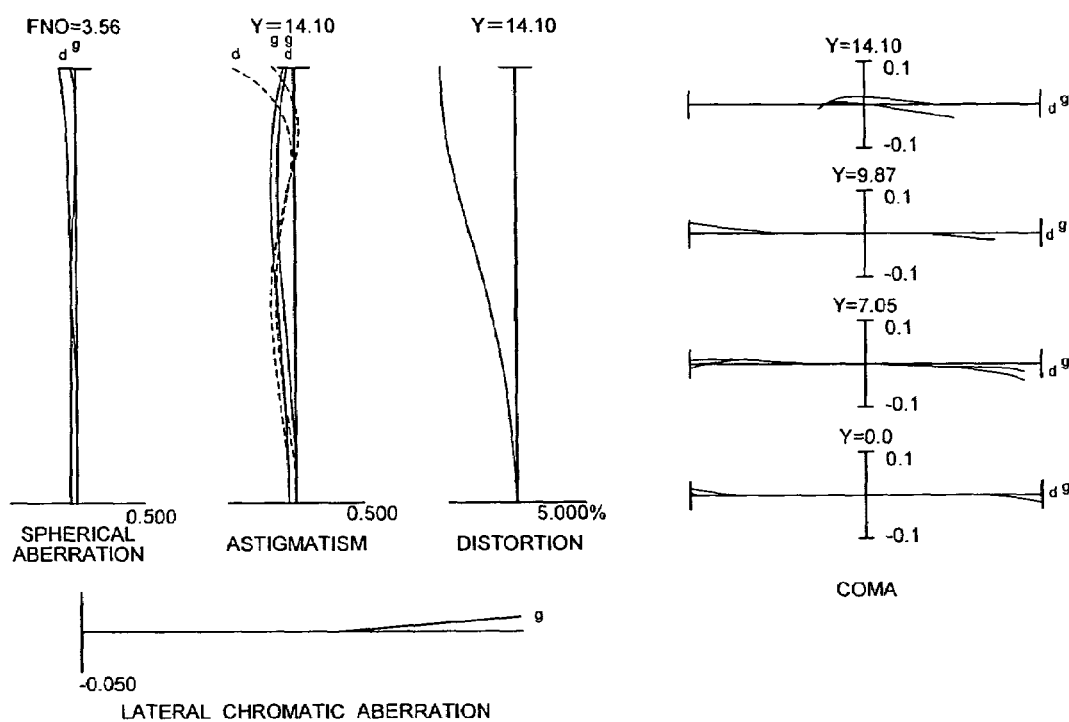
FIGS. 14A and 14B are graphs showing various aberrations of the zoom lens system with a vibration reduction according to Example 4 of the present invention in the wide-angle end state upon focusing on infinity and lateral aberrations in meridional image plane upon correcting rotational image blur of 0.60 degrees, respectively.
Figure 14B:
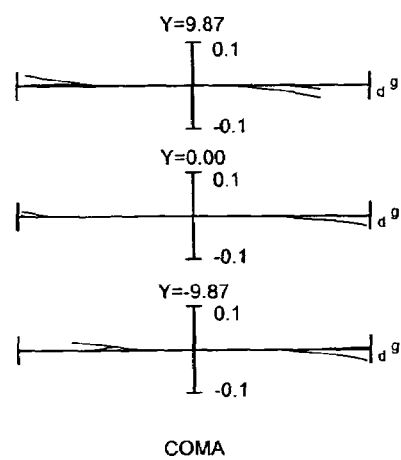

FIGS. 14A and 14B are graphs showing various aberrations of the zoom lens system with a vibration reduction according to Example 4 of the present invention in the wide-angle end state upon focusing on infinity and lateral aberrations in meridional image plane upon correcting rotational image blur of 0.60 degrees, respectively.

Figure 15:
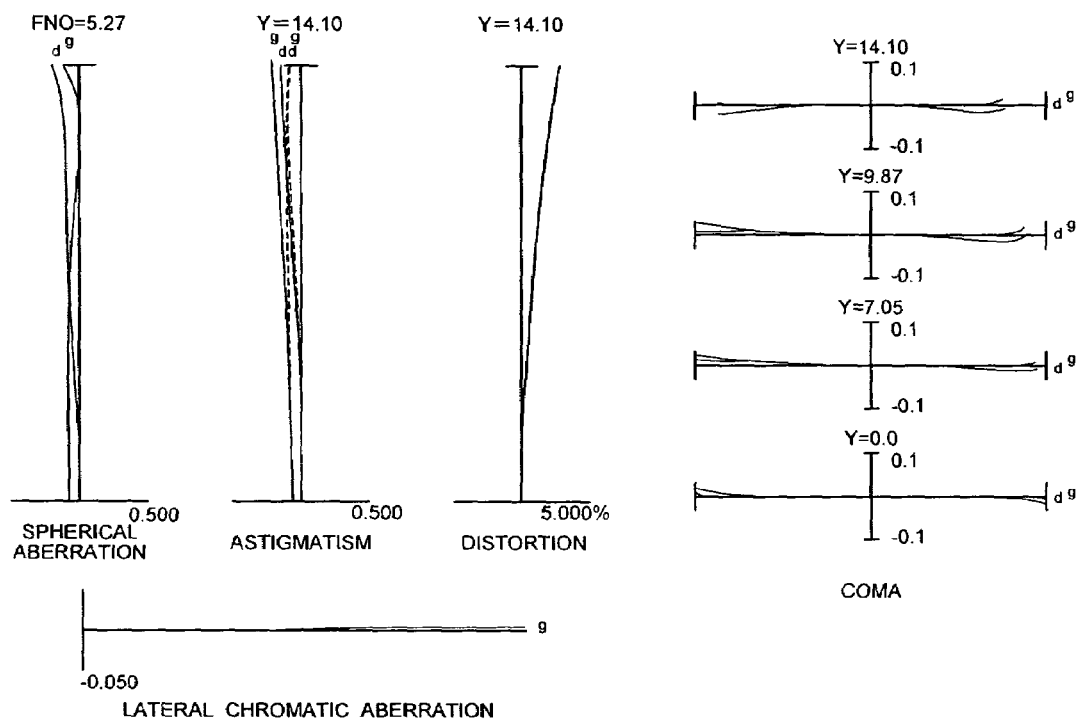
FIG. 15 is graphs showing various aberrations of the zoom lens system with a vibration reduction according to Example 4 of the present invention in the intermediate focal length state upon focusing on infinity.

FIG. 15 is graphs showing various aberrations of the zoom lens system with a vibration reduction according to Example 4 of the present invention in the intermediate focal length state upon focusing on infinity.

Figure 16A:
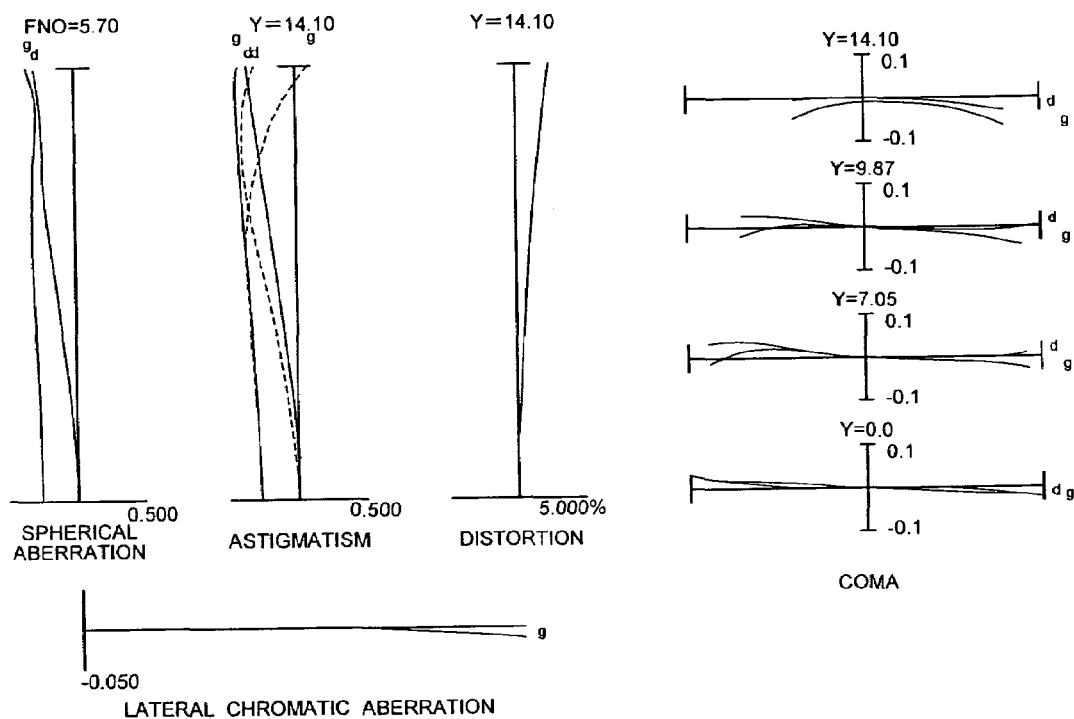
FIGS. 16A and 16B are graphs showing various aberrations of the zoom lens system with a vibration reduction according to Example 4 of the present invention in the telephoto end state upon focusing on infinity and lateral aberrations in meridional image plane upon correcting rotational image blur of 0.20 degrees, respectively.
Figure 16B:
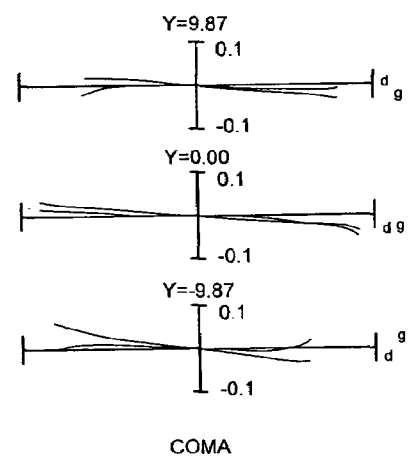

FIGS. 16A and 16B are graphs showing various aberrations of the zoom lens system with a vibration reduction according to Example 4 of the present invention in the telephoto end state upon focusing on infinity and lateral aberrations in meridional image plane upon correcting rotational image blur of 0.20 degrees, respectively.

As is apparent from the respective graphs, the zoom lens system with a vibration reduction according to Example 4 shows superb optical performance as a result of good corrections to various aberrations in each focal length state from the wide-angle end state to the telephoto end state.

EXAMPLE 5

Figure 17:
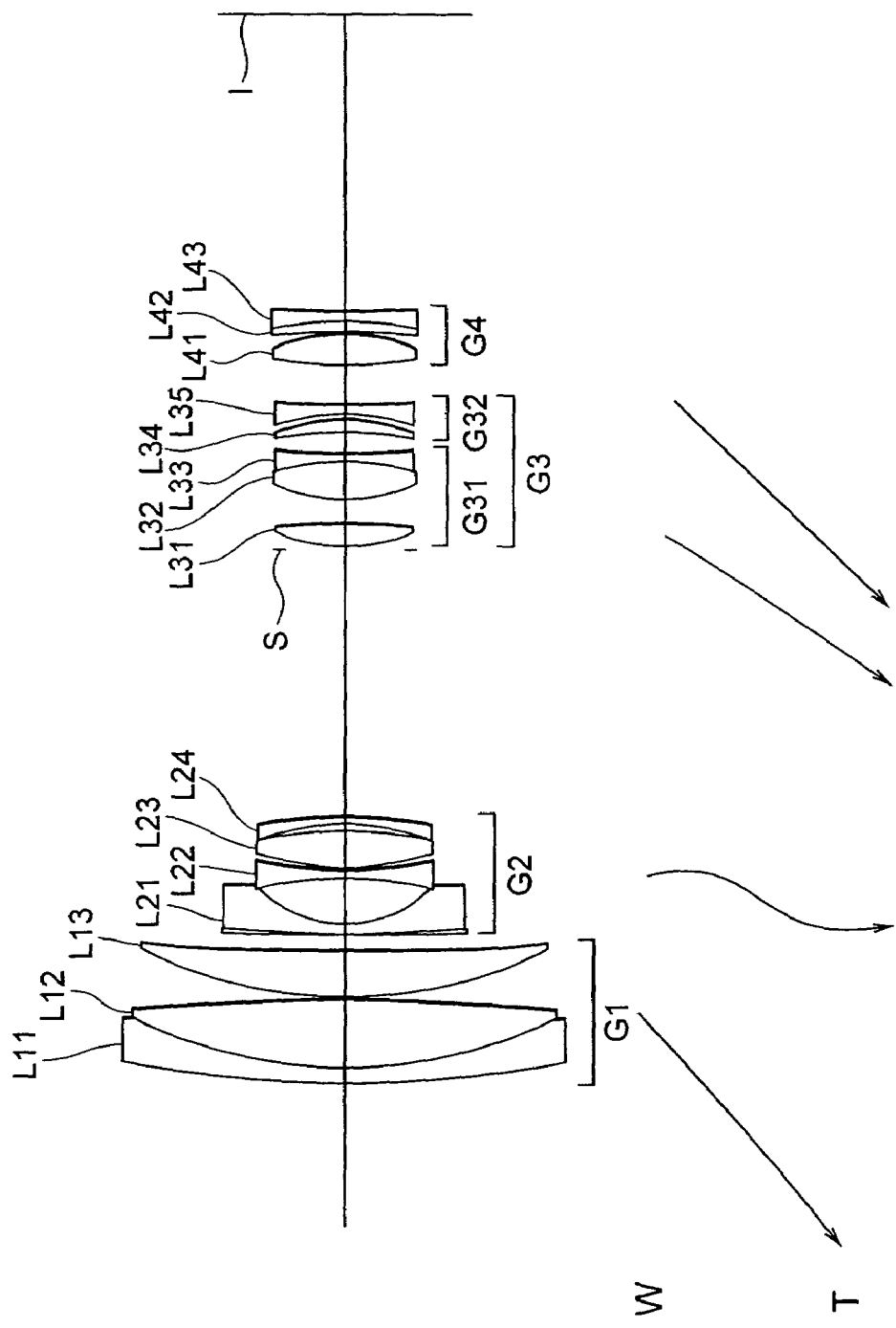
FIG. 17 is a diagram showing the lens configuration of a zoom lens system with a vibration reduction according to Example 5 of the present invention.

FIG. 17 is a diagram showing the lens configuration of a zoom lens system with a vibration reduction according to Example 5 the present invention.

The zoom lens system with a vibration reduction according to Example 5 is composed of, in order from an object, a first lens group G1 having positive refractive power, a second lens group G2 having negative refractive power, an aperture stop S, a third lens group G3 having positive refractive power, and a fourth lens group G4 having positive refractive power.

In the zoom lens system with a vibration reduction according to Example 5, when a state of lens group positions varies from a wide-angle end state to a telephoto end state, the first lens group G1, the third lens group G3, and the fourth lens group G4 move to the object and the second lens group G2 moves such that a distance between the first lens group G1 and the second lens group G2 increases, a distance between the second lens group G2 and the third lens group G3 decreases, and a distance between the third lens group G3 and the fourth lens group G4 decreases.

The first lens group G1 is composed of, in order from the object, a cemented lens constructed by a negative meniscus lens L11 having a convex surface facing to the object cemented with a double convex positive lens L12, and a positive meniscus lens L13 having a convex surface facing to the object.

The second lens group G2 is composed of, in order from the object, a negative lens L21 having a concave surface facing to the object, a double concave negative lens L22, a double convex positive lens L23, a negative meniscus lens L24 having a concave surface facing to the object. The negative meniscus lens L21 disposed to the most object side of the second lens group G2 is an aspherical lens forming an aspherical surface by applying a resin layer on the object side lens surface thereof.

The third lens group G3 is composed of, in order from the object, a front lens group G31 having positive refractive power and a rear lens group G32 having negative refractive power. Vibration reduction, in other words, correction of an image blur is carried out by shifting only the rear lens group G32 in the direction perpendicular to the optical axis.

The front lens group G31 is composed of, in order from the object, a double convex positive lens L31, and a cemented lens constructed by a double convex positive lens L32 cemented with a double concave negative lens L33.

The rear lens group G32 is composed of, in order from the object, a positive meniscus lens L34 having a concave surface facing to the object and a double concave negative lens L35.

The fourth lens group G4 is composed of, in order from the object, a double convex positive lens L41, a cemented lens constructed by a positive meniscus lens L42 having a concave surface facing to the object cemented with a double concave negative lens L43. The double convex positive lens L41 disposed to the most object side of the fourth lens group G4 is an aspherical lens forming aspherical surfaces on both lens surfaces thereof.

The aperture stop S is disposed between the second lens group G2 and the third lens group G3 as described above and moved together with the front lens group G31 of the third lens group G3 upon zooming from the wide-angle end state to the telephoto end state.

Focusing from infinity to a close object is carried out by moving the second lens group G2 to the object.

As described above, vibration reduction is carried out by shifting only the rear lens group G32 in the direction perpendicular to the optical axis. In the zoom lens system with a vibration reduction according to Example 5, since the vibration reduction coefficient K is 0.853 and the focal length f is 18.20 (mm) in the wide-angle end state, in order to correct rotational image blur of 0.60 degrees, the shift amount of the rear lens group G32 becomes 0.223 (mm). In the telephoto end state, since the vibration reduction coefficient K is 1.629 and the focal length f is 195.00 (mm), in order to correct rotational image blur of 0.20 degrees, the shift amount of the rear lens group G32 becomes 0.418 (mm).

Various values associated with a zoom lens system with a vibration reduction according to Example 5 are shown in Table 5.

TABLE 5

[Specifications]

| | W | M | T |
|---|---|---|---|
| f = | 18.20 | 68.00 | 195.00 |
| FNO = | 3.51 | 5.21 | 5.90 |
| 2ω = | 78.31° | 22.77° | 8.10° |

[Lens Data]

| | r | d | ν | n |
|---|---|---|---|---|
| 1 | 151.7612 | 2.0000 | 39.75 | 1.811176 |
| 2 | 64.9395 | 9.1000 | 82.52 | 1.497820 |
| 3 | −357.5769 | 0.1000 | | |
| 4 | 58.7451 | 6.5000 | 82.52 | 1.497820 |
| 5 | 363.3747 | (d5) | | |
| 6* | −807.3947 | 0.2000 | 38.09 | 1.553890 |
| 7 | 200.0000 | 1.2000 | 46.62 | 1.816000 |
| 8 | 16.0238 | 6.2506 | | |
| 9 | −44.9207 | 1.0000 | 46.62 | 1.816000 |
| 10 | 43.2189 | 0.2000 | | |
| 11 | 33.5585 | 5.0000 | 23.78 | 1.846660 |
| 12 | −51.1115 | 0.9618 | | |
| 13 | −31.3843 | 1.0000 | 46.62 | 1.816000 |
| 14 | −63.4876 | (d14) | | |
| 15 | ∞ | 0.5000 | Aperture Stop S | |
| 16 | 24.2877 | 2.9520 | 70.23 | 1.487490 |
| 17 | −134.1944 | 3.2655 | | |
| 18 | 20.8964 | 5.0469 | 82.52 | 1.497820 |
| 19 | −32.6565 | 1.4000 | 32.35 | 1.850260 |
| 20 | 100.9912 | 2.6002 | | |
| 21 | −49.6482 | 1.8194 | 23.78 | 1.846660 |
| 22 | −24.7427 | 0.5962 | | |
| 23 | −27.4165 | 1.4000 | 46.62 | 1.816000 |
| 24 | 109.2337 | (d24) | | |
| 25* | 42.6596 | 4.1922 | 59.46 | 1.583129 |
| 26* | −22.8314 | 0.2000 | | |
| 27 | −66.0651 | 1.3369 | 64.19 | 1.516798 |
| 28 | −46.6922 | 1.4000 | 33.05 | 1.666800 |
| 29 | 130.6179 | (Bf) | | |

[Aspherical Data]

Surface Number 6

κ = −97.0000
b = 1.25810E−05
c = −4.46880E−08
d = 1.56740E−10
e = −2.73470E−13

Surface Number 25

κ = 8.1667
b = −4.81190E−05
c = −6.15620E−08
d = −7.55570E−10
e = 0.00000E+00

Surface Number 26

κ = −1.1745
b = −8.75580E−06
c = −4.63400E−08
d = −2.85400E−10
e = −6.98480E−13

TABLE 5-continued

| | W | M | T |
|---|---|---|---|
| | [Variable Distances] | | |
| f | 18.19979 | 67.99861 | 194.99522 |
| d5 | 1.90000 | 38.09445 | 66.25425 |
| d14 | 35.73783 | 12.72608 | 2.00000 |
| d24 | 5.34049 | 2.10378 | 1.16996 |
| Bf | 38.99922 | 69.38355 | 80.55216 |
| | [Moving Amount upon Focusing] | | |
| f | 18.20 | 68.00 | 195.00 |
| δ1 | 1.226 | 3.218 | 10.874 |

[Values for Conditional Expressions]

(1): f1/fw = 6.087
(2): Bfw/fw = 2.143
(3): f3/fw = 2.846
(4): f3R/f3F = −1.554
(5): f3/f4 = 1.202
(6): fw/Re = 0.139
(7): M2t = −0.820

Figure 18A:
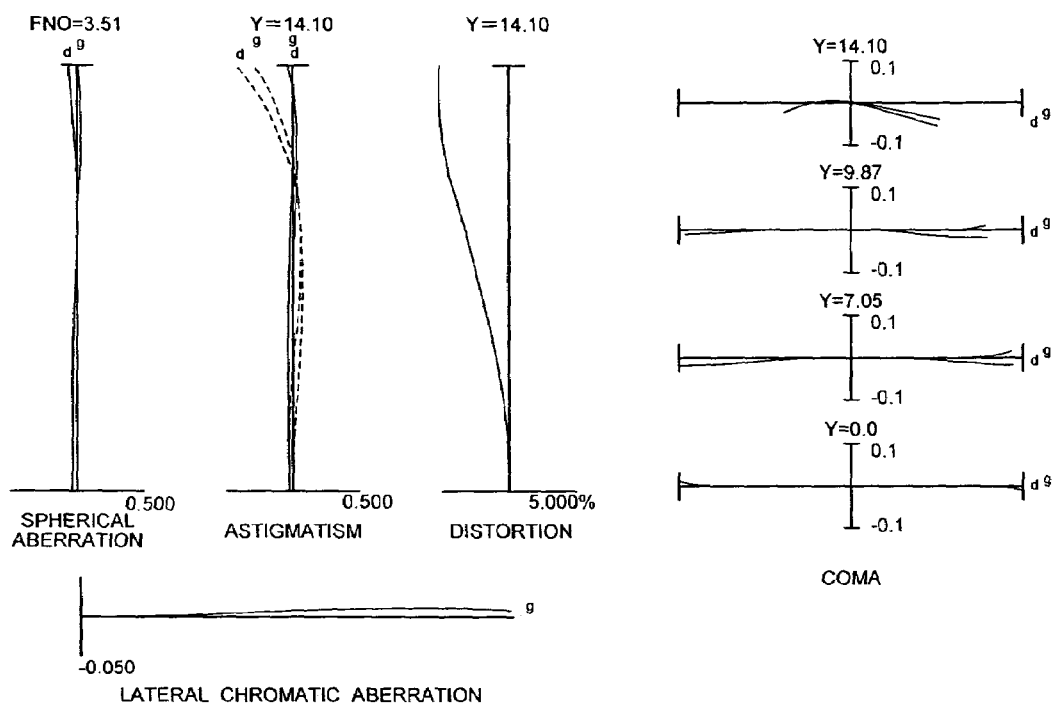
FIGS. 18A and 18B are graphs showing various aberrations of the zoom lens system with a vibration reduction according to Example 5 of the present invention in the wide-angle end state upon focusing on infinity and lateral aberrations in meridional image plane upon correcting rotational image blur of 0.60 degrees, respectively.
Figure 18B:
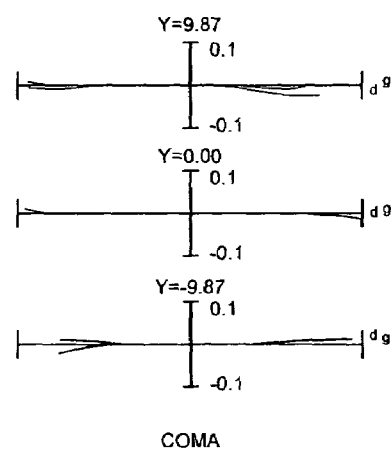

FIGS. 18A and 18B are graphs showing various aberrations of the zoom lens system with a vibration reduction according to Example 5 of the present invention in the wide-angle end state upon focusing on infinity and lateral aberrations in meridional image plane upon correcting rotational image blur of 0.60 degrees, respectively.

Figure 19:
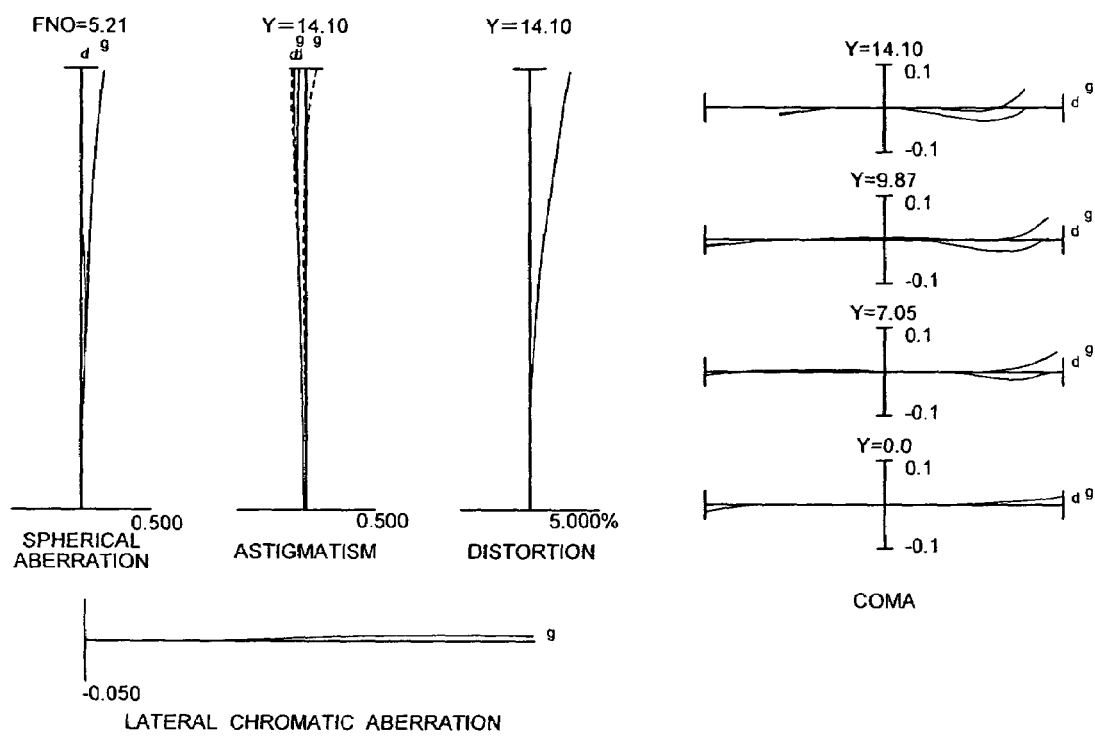
FIG. 19 is graphs showing various aberrations of the zoom lens system with a vibration reduction according to Example 5 of the present invention in the intermediate focal length state upon focusing on infinity

FIG. 19 is graphs showing various aberrations of the zoom lens system with a vibration reduction according to Example 5 of the present invention in the intermediate focal length state upon focusing on infinity.

Figure 20A:
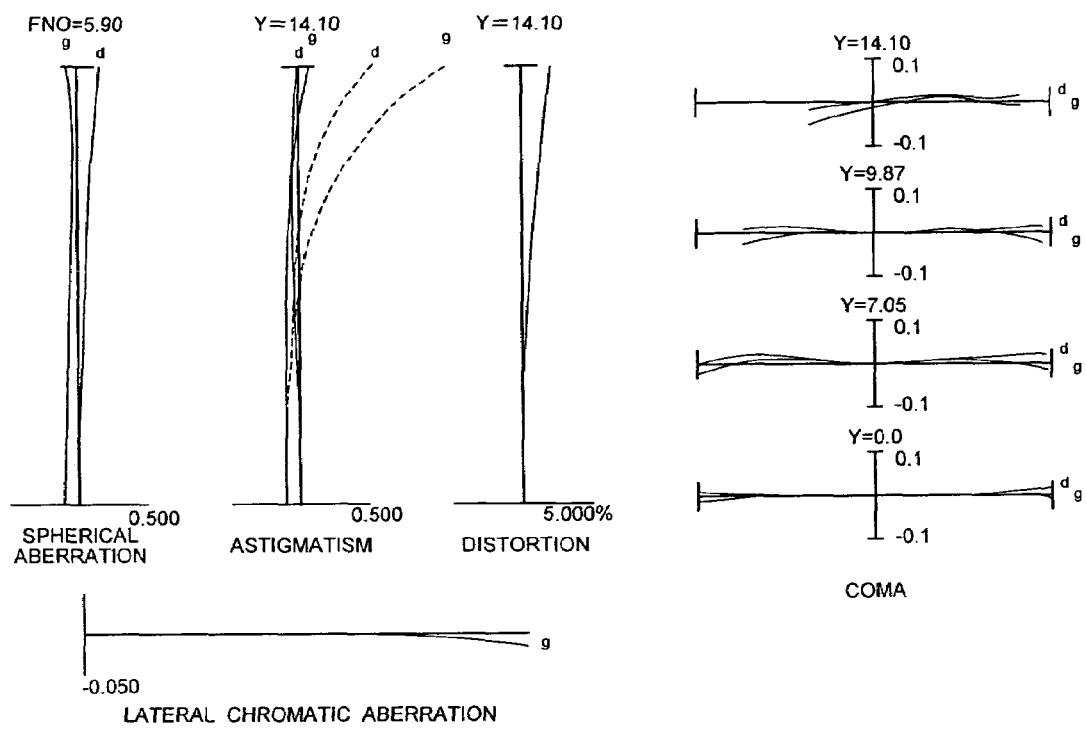
FIGS. 20A and 20B are graphs showing various aberrations of the zoom lens system with a vibration reduction according to Example 5 of the present invention in the telephoto end state upon focusing on infinity and lateral aberrations in meridional image plane upon correcting rotational image blur of 0.20 degrees, respectively.
Figure 20B:
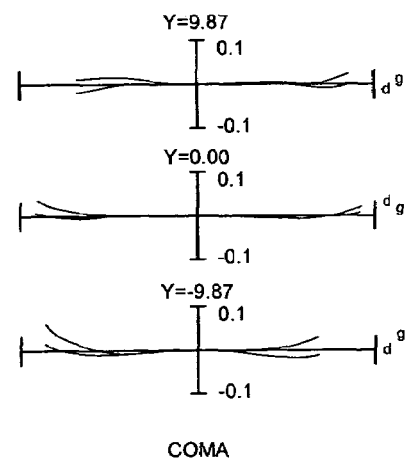

FIGS. 20A and 20B are graphs showing various aberrations of the zoom lens system with a vibration reduction according to Example 5 of the present invention in the telephoto end state upon focusing on infinity and lateral aberrations in meridional image plane upon correcting rotational image blur of 0.20 degrees, respectively.

As is apparent from the respective graphs, the zoom lens system with a vibration reduction according to Example 5 shows superb optical performance as a result of good corrections to various aberrations in each focal length state from the wide-angle end state to the telephoto end state.

EXAMPLE 6

FIG. 21 is a diagram showing the lens configuration of a zoom lens system with a vibration reduction according to Example 6 of the present invention.

The zoom lens system with a vibration reduction according to Example 6 is composed of, in order from an object, a first lens group G1 having positive refractive power, a second lens group G2 having negative refractive power, an aperture stop S, a third lens group G3 having positive refractive power, and a fourth lens group G4 having positive refractive power.

In the zoom lens system with a vibration reduction according to Example 6, when a state of lens group positions varies from a wide-angle end state to a telephoto end state, the first lens group G1, the third lens group G3, and the fourth lens group G4 move to the object and the second lens group G2 moves such that a distance between the first lens group G1 and the second lens group G2 increases, a distance between the second lens group G2 and the third lens group G3 decreases, and a distance between the third lens group G3 and the fourth lens group G4 decreases.

The first lens group G1 is composed of, in order from the object, a cemented lens constructed by a negative meniscus lens L11 having a convex surface facing to the object cemented with a double convex positive lens L12, and a positive meniscus lens L13 having a convex surface facing to the object.

The second lens group G2 is composed of, in order from the object, a negative meniscus lens L21 having a convex surface facing to the object, a double concave negative lens L22, a double convex positive lens L23, a negative meniscus lens L24 having a concave surface facing to the object. The negative meniscus lens L21 disposed to the most object side of the second lens group G2 is an aspherical lens forming an aspherical surface by applying a resin layer on the object side lens surface thereof.

The third lens group G3 is composed of, in order from the object, a front lens group G31 having positive refractive power and a rear lens group G32 having negative refractive power. Vibration reduction, in other words, correction of an image blur is carried out by shifting only the rear lens group G32 in the direction perpendicular to the optical axis.

The front lens group G31 is composed of, in order from the object, a double convex positive lens L31, and a cemented lens constructed by a double convex positive lens L32 cemented with a double concave negative lens L33.

The rear lens group G32 is composed of, in order from the object, a double concave negative lens L34, a cemented lens constructed by a positive meniscus lens L35 having a concave surface facing to the object cemented with a double concave negative lens L36.

The fourth lens group G4 is composed of, in order from the object, a double convex positive lens L41, a double convex positive lens L42, and a cemented lens constructed by a double concave negative lens L43 cemented with a positive meniscus lens L44 having a convex surface facing to the object. The double convex positive lens L41 disposed to the most object side of the fourth lens group G4 is an aspherical lens forming aspherical surfaces on both lens surfaces thereof.

The aperture stop S is disposed between the second lens group G2 and the third lens group G3 as described above and moved together with the front lens group G31 of the third lens group G3 upon zooming from the wide-angle end state to the telephoto end state.

Focusing from infinity to a close object is carried out by moving the second lens group G2 to the object.

As described above, vibration reduction is carried out by shifting only the rear lens group G32 in the direction perpendicular to the optical axis. In the zoom lens system with a vibration reduction according to Example 6, since the vibration reduction coefficient K is 0.861 and the focal length f is 18.20 (mm) in the wide-angle end state, in order to correct rotational image blur of 0.60 degrees, the shift amount of the rear lens group G32 becomes 0.221 (mm). In the telephoto end state, since the vibration reduction coefficient K is 1.629 and the focal length f is 195.00 (mm), in order to correct rotational image blur of 0.20 degrees, the shift amount of the rear lens group G32 becomes 0.418 (mm).

Various values associated with a zoom lens system with a vibration reduction according to Example 6 are shown in Table 6.

TABLE 6

[Specifications]

|  | W | M | T |
|---|---|---|---|
| f = | 18.20 | 68.01 | 195.00 |
| FNO = | 3.39 | 5.13 | 5.92 |
| 2ω = | 78.36° | 22.85° | 8.13° |

[Lens Data]

|  | r | d | ν | n |
|---|---|---|---|---|
| 1 | 141.0864 | 2.0000 | 32.35 | 1.850260 |
| 2 | 58.5781 | 9.1000 | 82.52 | 1.497820 |
| 3 | −703.5686 | 0.1000 |  |  |
| 4 | 57.7535 | 6.5000 | 55.53 | 1.696797 |
| 5 | 295.6638 | (d5) |  |  |
| 6* | 300.3003 | 0.2000 | 38.09 | 1.553890 |
| 7 | 123.1710 | 1.2000 | 46.62 | 1.816000 |
| 8 | 15.1313 | 7.0493 |  |  |
| 9 | −28.6448 | 1.0000 | 46.62 | 1.816000 |
| 10 | 50.7903 | 0.2000 |  |  |
| 11 | 40.1093 | 5.0000 | 23.78 | 1.846660 |
| 12 | −28.3281 | 1.0911 |  |  |
| 13 | −20.5154 | 1.0000 | 46.62 | 1.816000 |
| 14 | −61.0747 | (d14) |  |  |
| 15 | ∞ | 0.5000 | Aperture Stop S | |
| 16 | 30.3522 | 3.5114 | 58.90 | 1.518229 |
| 17 | −35.5964 | 0.2000 |  |  |
| 18 | 29.5783 | 4.0343 | 82.52 | 1.497820 |
| 19 | −24.0429 | 1.2000 | 32.35 | 1.850260 |
| 20 | 1141.3935 | 1.7299 |  |  |
| 21 | −178.6037 | 1.0000 | 46.62 | 1.816000 |
| 22 | 1221.1770 | 1.1998 |  |  |
| 23 | −40.9310 | 2.9628 | 34.97 | 1.800999 |
| 24 | −15.1852 | 1.0000 | 53.20 | 1.693501 |
| 25 | 1194.9388 | (d25) |  |  |
| 26* | 45.8535 | 4.0000 | 59.46 | 1.583129 |
| 27* | −56.8890 | 0.2000 |  |  |
| 28 | 1028.4928 | 4.7000 | 82.52 | 1.497820 |
| 29 | −23.1426 | 0.2023 |  |  |
| 30 | −108.2949 | 1.2000 | 42.71 | 1.834807 |
| 31 | 21.8681 | 3.1831 | 64.19 | 1.516798 |
| 32 | 299.8660 | (Bf) |  |  |

[Aspherical Data]

Surface Number 6

κ = 99.0000
b = 1.83390E−05
c = −5.64390E−08
d = 1.47550E−10
e = −8.78500E−14

Surface Number 26

κ = 8.5914
b = −2.71250E−05
c = −3.57380E−08
d = −1.10300E−09
e = 0.00000E+00

Surface Number 27

κ = −20.6352
b = 5.95660E−06
c = 2.14540E−08
d = −9.09280E−10
e = 1.42270E−13

|  | W | M | T |
|---|---|---|---|

[Variable Distances]

|  | | | |
|---|---|---|---|
| f | 18.20007 | 68.00967 | 194.99999 |
| d5 | 2.30000 | 33.71167 | 56.78494 |
| d14 | 26.62125 | 9.94876 | 2.00000 |
| d25 | 9.01461 | 2.72428 | 1.00000 |
| B.f. | 39.00002 | 72.04659 | 85.15093 |

TABLE 6-continued

[Moving Amount upon Focusing]

| f | 18.20 | 68.00 | 195.00 |
|---|---|---|---|
| δ1 | 0.802 | 2.246 | 7.763 |

[Values for Conditional Expressions]

| | |
|---|---|
| (1): f1/fw = | 5.229 |
| (2): Bfw/fw = | 2.143 |
| (3): f3/fw = | 2.581 |
| (4): f3R/f3F = | −1.893 |
| (5): f3/f4 = | 1.014 |
| (6): fw/Re = | 0.061 |
| (7): M2t = | −0.773 |

Figure 22A:
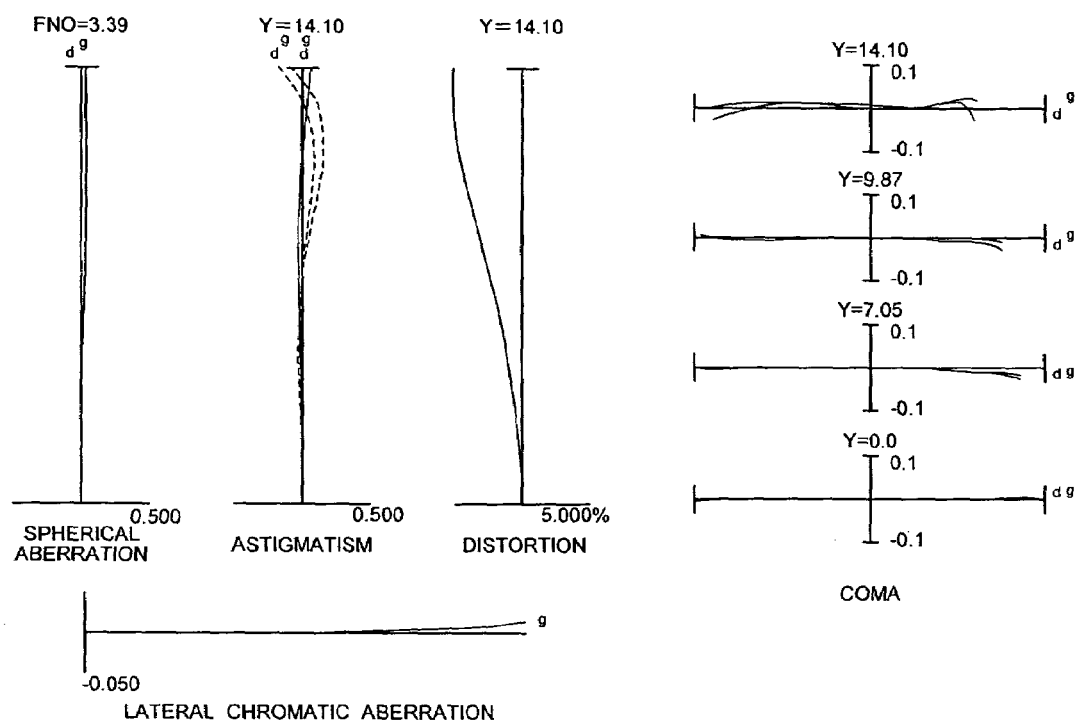
FIGS. 22A and 22B are graphs showing various aberrations of the zoom lens system with a vibration reduction according to Example 6 of the present invention in the wide-angle end state upon focusing on infinity and lateral aberrations in meridional image plane upon correcting rotational image blur of 0.60 degrees, respectively.
Figure 22B:
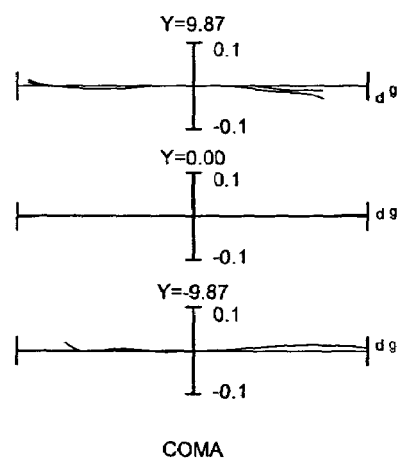

FIGS. 22A and 22B are graphs showing various aberrations of the zoom lens system with a vibration reduction according to Example 6 of the present invention in the wide-angle end state upon focusing on infinity and lateral aberrations in meridional image plane upon correcting rotational image blur of 0.60 degrees, respectively.

Figure 23:
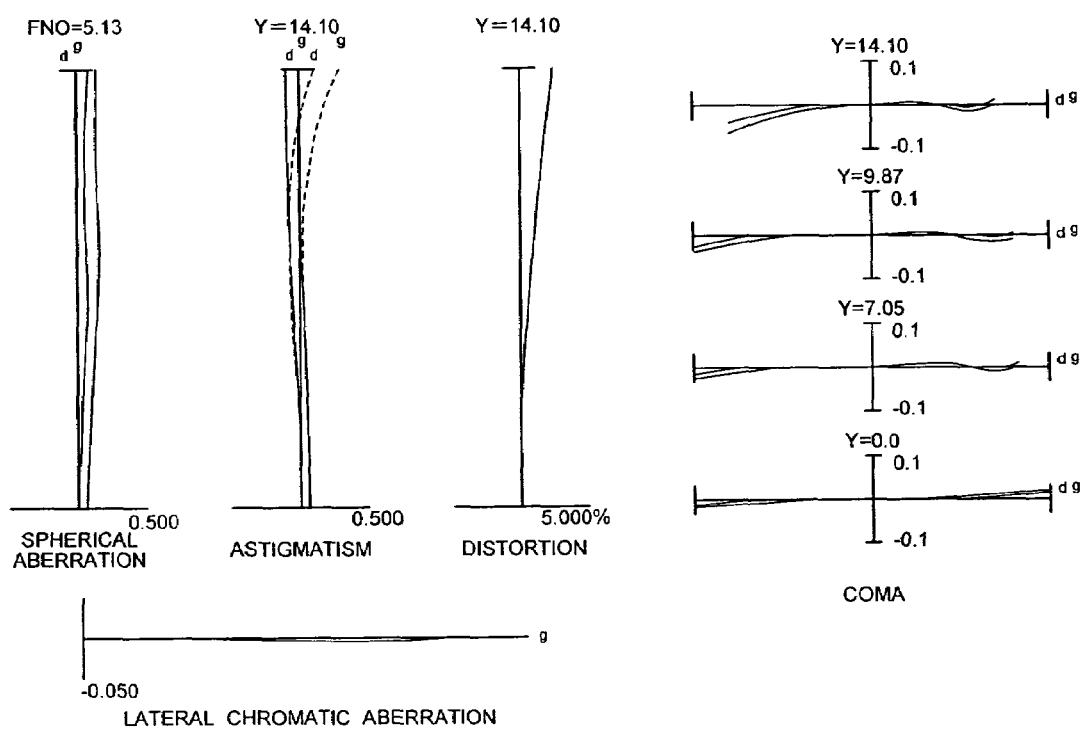
FIG. 23 is graphs showing various aberrations of the zoom lens system with a vibration reduction according to Example 6 of the present invention in the intermediate focal length state upon focusing on infinity.

FIG. 23 is graphs showing various aberrations of the zoom lens system with a vibration reduction according to Example 6 of the present invention in the intermediate focal length state upon focusing on infinity.

Figure 24A:
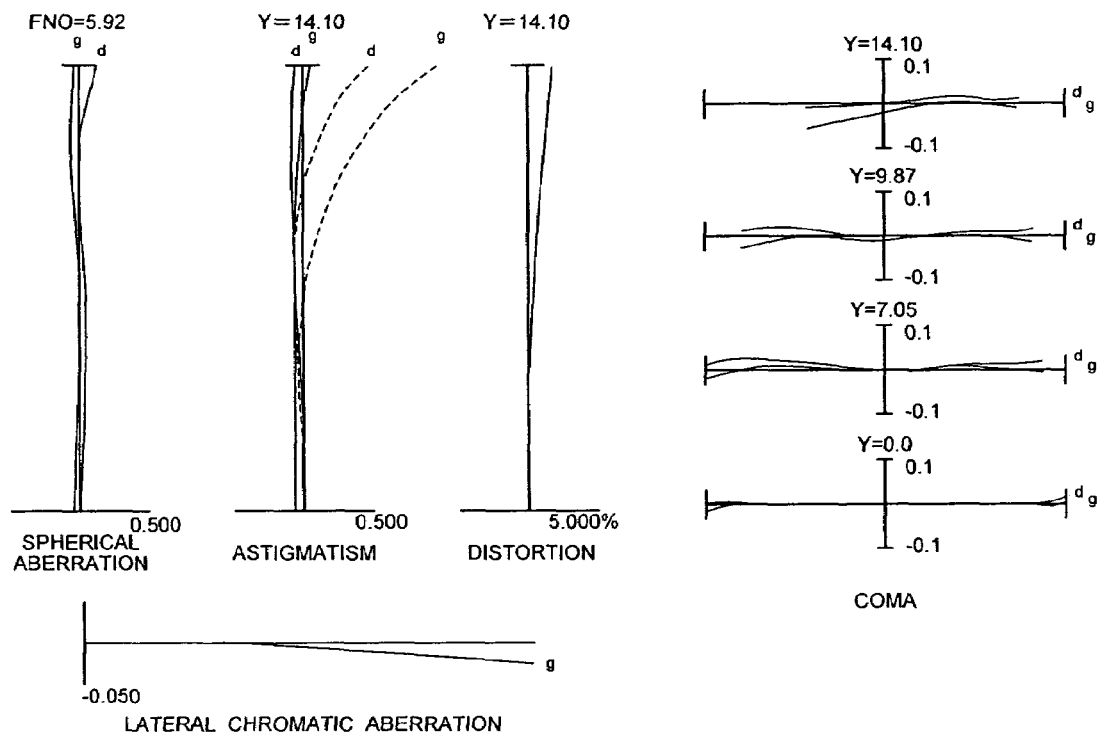
FIGS. 24A and 24B are graphs showing various aberrations of the zoom lens system with a vibration reduction according to Example 6 of the present invention in the telephoto end state upon focusing on infinity and lateral aberrations in meridional image plane upon correcting rotational image blur of 0.20 degrees, respectively.
Figure 24B:
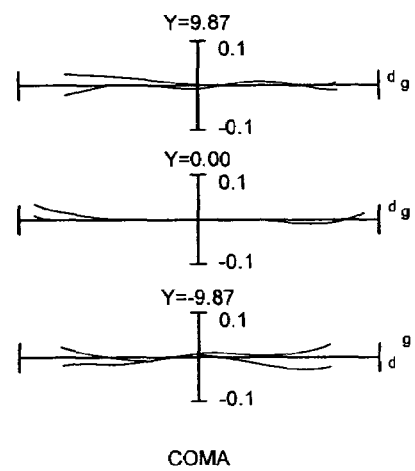

FIGS. 24A and 24B are graphs showing various aberrations of the zoom lens system with a vibration reduction according to Example 6 of the present invention in the telephoto end state upon focusing on infinity and lateral aberrations in meridional image plane upon correcting rotational image blur of 0.20 degrees, respectively.

As is apparent from the respective graphs, the zoom lens system with a vibration reduction according to Example 6 shows superb optical performance as a result of good corrections to various aberrations in each focal length state from the wide-angle end state to the telephoto end state.

As described above, the present invention makes it possible to provide a zoom lens system with a vibration reduction having a long back focal length capable of being used for a single-lens-reflex digital camera, a high zoom ratio of about ten, and an angle of view of about 70 degrees or more in the wide-angle end state.

Incidentally, it is needless to say that although zoom lens systems with a four-lens-group configuration are shown as examples of the present invention, a zoom lens system simply added by a lens group to a four-lens-group configuration is included in the spirit of the present invention. Moreover, in the configuration of each lens group, a lens group simply added by lens elements to the lens group shown in examples is included in the spirit or scope of the present invention.

Moreover, it is needless to say that the zoom lens system with a vibration reduction according to the present invention is not limited to use for a single-lens-reflex digital camera and suitably used for a film camera.

Additional advantages and modification will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A zoom lens system comprising, in order from an object:
a first lens group having positive refractive power;
a second lens group having negative refractive power;
a third lens group having positive refractive power; and
a fourth lens group having positive refractive power,
wherein when a state of lens group positions varies from a wide-angle end state to a telephoto end state, a distance between the first lens group and the second lens group increases, a distance between the second lens group and the third lens group decreases, and a distance between the third lens group and the fourth lens group varies,
the third lens group consists of, in order from the object, a front lens group having positive refractive power and a rear lens group having negative refractive power, and
only the rear lens group is capable of shifting in a direction substantially perpendicular to an optical axis to correct an image blur caused by a camera shake, and
wherein the following conditional expression is satisfied:

$$3.5 < f1/fw < 8.0$$

where f1 denotes the focal length of the first lens group and fw denotes the focal length of the zoom lens system in the wide-angle end state.

2. The zoom lens system according to claim 1, wherein the following conditional expression is satisfied:

$$1.70 < Bfw/fw < 3.00$$

where Bfw denotes the back focal length in the wide-angle end state.

3. The zoom lens system according to claim 1, wherein the following conditional expressions are satisfied:

$$1.6 < f3/fw < 4.5$$

$$-2.3 < f3R/f3F < -1.2$$

where f3 denotes the focal length of the third lens group, f3F denotes the focal length of the front lens group, and f3R denotes the focal length of the rear lens group.

4. The zoom lens system according to claim 1, wherein when a state of lens group positions varies from a wide-angle end state to a telephoto end state, the first lens group, the third lens group, and the fourth lens group move to the object.

5. The zoom lens system according to claim 1, wherein a distance between the third lens group and the fourth lens group in the wide-angle end state is larger than that in the telephoto end state.

6. The zoom lens system according to claim 1, wherein the following conditional expression is satisfied:

$$0.80 < f3/f4 < 1.60$$

where f3 denotes the focal length of the third lens group and f4 denotes the focal length of the fourth lens group.

7. The zoom lens system according to claim 1, wherein the following conditional expression is satisfied:

$$-0.90 < fw/Re < 0.20$$

where Re denotes a radius of curvature of the most image side lens surface of the zoom lens system.

8. The zoom lens system according to claim 1, wherein the rear lens group is composed of a cemented lens constructed by, in order from the object, a double concave negative lens cemented with a positive meniscus lens having a convex surface facing to the object.

9. The zoom lens system according to claim 8, wherein the most object side lens surface of the rear lens group is an aspherical surface.

10. The zoom lens system according to claim 1, wherein the rear lens group is composed of, in order from the object, a positive meniscus lens having a concave surface facing to the object and a double concave negative lens.

11. The zoom lens system according to claim 1, wherein the fourth lens group includes, in order from the object, a double convex positive lens having an aspherical surface facing to the object, a positive lens having a convex surface facing to the image, and a double concave negative lens.

12. The zoom lens system according to claim 1, wherein focusing from infinity to a close object is carried out by moving the second lens group to the object and the following conditional expression is satisfied:

$$-0.95 < M2t < -0.70$$

where M2t denotes a magnification of the second lens group in the telephoto end state.

13. A zoom lens system comprising, in order from an object:
a first lens group having positive refractive power;
a second lens group having negative refractive power;
a third lens group having positive refractive power; and
a fourth lens group having positive refractive power,
wherein when a state of lens group positions varies from a wide-angle end state to a telephoto end state, a distance between the first lens group and the second lens group increases, a distance between the second lens group and the third lens group decreases, and a distance between the third lens group and the fourth lens group varies,
the third lens group consists of, in order from the object, a front lens group having positive refractive power and a rear lens group having negative refractive power, and
only the rear lens group is capable of shifting in a direction substantially perpendicular to an optical axis to correct an image blur caused by a camera shake, and
wherein the following conditional expression is satisfied:

$$1.70 < Bfw/fw < 3.00$$

where fw denotes the focal length of the zoom lens system in the wide-angle end state and Bfw denotes the back focal length in the wide-angle end state.

14. The zoom lens system according to claim 13, wherein the following conditional expressions are satisfied:

$$1.6 < f3/fw < 4.5$$

$$-2.3 < f3R/f3F < -1.2$$

where f3 denotes the focal length of the third lens group, f3F denotes the focal length of the front lens group, and f3R denotes the focal length of the rear lens group.

15. The zoom lens system according to claim 13, wherein when a state of lens group positions varies from a wide-angle end state to a telephoto end state, the first lens group, the third lens group, and the fourth lens group move to the object.

16. The zoom lens system according to claim 13, wherein a distance between the third lens group and the fourth lens group in the wide-angle end state is larger than that in the telephoto end state.

17. The zoom lens system according to claim 13, wherein the following conditional expression is satisfied:

$$0.80 < f3/f4 < 1.60$$

where f3 denotes the focal length of the third lens group and f4 denotes the focal length of the fourth lens group.

18. The zoom lens system according to claim 13, wherein the following conditional expression is satisfied:

$$-0.90 < fw/Re < 0.20$$

where Re denotes a radius of curvature of the most image side lens surface of the zoom lens system.

19. The zoom lens system according to claim 13, wherein the rear lens group is composed of a cemented lens constructed by, in order from the object, a double concave negative lens cemented with a positive meniscus lens having a convex surface facing to the object.

20. The zoom lens system according to claim 13, wherein the rear lens group is composed of, in order from the object, a positive meniscus lens having a concave surface facing to the object and a double concave negative lens.

21. A zoom lens system comprising, in order from an object:
a first lens group having positive refractive power;
a second lens group having negative refractive power;
a third lens group having positive refractive power; and
a fourth lens group having positive refractive power,
wherein zooming is carried out by varying distances between respective lens groups,
the third lens group consists of, in order from the object, a front lens group having positive refractive power and a rear lens group having negative refractive power,
only the rear lens group is capable of shifting in a direction substantially perpendicular to an optical axis to correct variation in focusing position,
at least one lens surface in the rear lens group is an aspherical surface having a shape that positive refractive power becomes stronger or negative refractive power becomes weaker from the optical axis to the periphery than a spherical surface having a paraxial radius of curvature, and
the following conditional expression is satisfied:

$$3.5 < f1/fw < 8.0$$

where f1 denotes the focal length of the first lens group and fw denotes the focal length of the zoom lens system in the wide-angle end state.

22. The zoom lens system according to claim 21, wherein the following conditional expressions are satisfied:

$$1.6 < f3/fw < 4.5$$

$$0.0001 \times (h/2) < |X50| < 0.01 \times (h/2)$$

$$0.0001 \times (h/2) < |Xm| < 0.01 \times (h/2)$$

$$|X50|/|Xm| < 1$$

where f3 denotes the focal length of the third lens group, h denotes an effective diameter of the aspherical surface, X50 denotes a deviation of the aspherical shape relative to the spherical shape of the paraxial radius of curvature at the 50% height of the effective diameter from the optical axis of the aspherical surface, and Xm denotes a deviation of the aspherical shape relative to the spherical shape of the paraxial radius of curvature at the 100% height of the effective diameter from the optical axis of the aspherical surface.

23. The zoom lens system according to claim 21, wherein the most object side lens in the fourth lens group is a positive lens and the image side surface of the positive lens is a convex shape facing to the image.

24. The zoom lens system according to claim 21, wherein upon zooming from the wide-angle end state to the telephoto end state, the first lens group, the third lens group and the fourth lens group move to the object.

25. The zoom lens system according to claim 21, wherein a distance between the third lens group and the fourth lens group in the wide-angle end state is larger than that in the telephoto end state.

26. The zoom lens system according to claim 21, wherein the following conditional expression is satisfied:

$$-2.3 < f3R/f3F < -1.2$$

where f3F denotes the focal length of the front lens group and f3R denotes the focal length of the rear lens group.

27. The zoom lens system according to claim 21, wherein the following conditional expressions are satisfied:

$$0.80 < f3/f4 < 1.60$$

$$1.70 < Bfw/fw < 3.00$$

where f3 denotes the focal length of the third lens group, f4 denotes the focal length of the fourth lens group, and Bfw denotes the back focal length in the wide-angle end state.

28. The zoom lens system according to claim 21, wherein an aperture stop is disposed between the second lens group and the third lens group and the following conditional expression is satisfied:

$$0.15 < Ds/f3 < 0.30$$

where f3 denotes the focal length of the third lens group and Ds denotes a distance between the aperture stop and the most object side lens surface of the rear lens group along the optical axis.

29. The zoom lens system according to claim 21, wherein the following conditional expression is satisfied:

$$-0.90 < fw/Re < 0.20$$

where Re denotes a radius of curvature of the most image side lens surface of the zoom lens system.

30. The zoom lens system according to claim 21, wherein the fourth lens group has at least one cemented lens and the cemented surface of the cemented lens has a convex shape facing to the image.

31. The zoom lens system according to claim 21, wherein the following conditional expression is satisfied:

$$1.70 < Bfw/fw < 3.00$$

where fw denotes the focal length of the zoom lens system in the wide-angle end state and Bfw denotes the back focal length in the wide-angle end state.

32. A method for forming an image of an object and varying a focal length of a zoom lens system that comprises, in order from the object, a first lens group having positive refractive power, a second lens group having negative refractive power, a third lens group having positive refractive power, and a fourth lens group having positive refractive power; the method comprising steps of:
varying the focal length by increasing a distance between the first lens group and the second lens group, decreasing a distance between the second lens group and the third lens group, and varying a distance between the third lens group and the fourth lens group when the state of the zoom lens system varies from a wide-angle end state to a telephoto end state;
providing the third lens group that has, in order from the object, a front lens group having positive refractive power and a rear lens group having negative refractive power;
shifting only the rear lens group in a direction substantially perpendicular to an optical axis to correct an image blur caused by a camera shake; and
satisfying the following conditional expression:

$$3.5 < f1/fw < 8.0$$

where f1 denotes the focal length of the first lens group and fw denotes the focal length of the zoom lens system in the wide-angle end state.

33. The method according to claim 32, further comprising a step of:
satisfying the following conditional expression:

$$1.70 < Bfw/fw < 3.00$$

where fw denotes the focal length of the zoom lens system in the wide-angle end state and Bfw denotes the back focal length in the wide-angle end state.

34. A method for forming an image of an object and varying a focal length of a zoom lens system that comprises, in order from the object, a first lens group having positive refractive power, a second lens group having negative refractive power, a third lens group having positive refractive power, and a fourth lens group having positive refractive power; the method comprising steps of:
varying the focal length by increasing a distance between the first lens group and the second lens group, decreasing a distance between the second lens group and the third lens group, and varying a distance between the third lens group and the fourth lens group when the state of the zoom lens system varies from a wide-angle end state to a telephoto end state;
providing the third lens group that has, in order from the object, a front lens group having positive refractive power and a rear lens group having negative refractive power;
shifting only the rear lens group in a direction substantially perpendicular to an optical axis to correct an image blur caused by a camera shake; and
satisfying the following conditional expression:

$$1.70 < Bfw/fw < 3.00$$

where fw denotes the focal length of the zoom lens system in the wide-angle end state and Bfw denotes the back focal length in the wide-angle end state.

35. A method for forming an image of an object and varying a focal length of a zoom lens system that comprises, in order from the object, a first lens group having positive refractive power, a second lens group having negative refractive power, a third lens group having positive refractive power, and a fourth lens group having positive refractive power; the method comprising steps of:
varying the focal length by varying distances between respective lens groups when the state of the zoom lens system varies from a wide-angle end state to a telephoto end state;
providing the third lens group that has, in order from the object, a front lens group having positive refractive power and a rear lens group having negative refractive power;
shifting only the rear lens group in a direction substantially perpendicular to an optical axis to correct variation in focusing position;
providing an aspherical surface on at least one lens surface in the rear lens group, wherein the aspherical surface has a shape that positive refractive power becomes stronger or negative refractive power becomes weaker from the optical axis to the periphery than a spherical surface having a paraxial radius of curvature; and satisfying the following conditional expression:

$$3.5 < f1/fw < 8.0$$

where f1 denotes the focal length of the first lens group and fw denotes the focal length of the zoom lens system in the wide-angle end state.

36. The method according to claim 35, further comprising a step of:

satisfying the following conditional expressions:

$$1.70 < Bfw/fw < 3.00$$

where fw denotes the focal length of the zoom lens system in the wide-angle end state and Bfw denotes the back focal length in the wide-angle end state.

* * * * *